United States Patent
Jaskiewicz et al.

(10) Patent No.: US 10,263,282 B2
(45) Date of Patent: Apr. 16, 2019

(54) EXTENSIBLE PROVIDER CONNECTION SYSTEMS, METHODS AND ARCHITECTURE

(71) Applicant: Open Text SA ULC, Halifax (CA)

(72) Inventors: Michael Gerard Jaskiewicz, Urbandale, IA (US); Claiborne Holt Johnson, III, Austin, TX (US)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 15/994,377

(22) Filed: May 31, 2018

(65) Prior Publication Data
US 2018/0337427 A1 Nov. 22, 2018

Related U.S. Application Data

(63) Continuation of application No. 14/812,473, filed on Jul. 29, 2015, now Pat. No. 10,015,273.
(Continued)

(51) Int. Cl.
*H04L 29/08* (2006.01)
*H01M 10/0565* (2010.01)
(Continued)

(52) U.S. Cl.
CPC ......... *H01M 10/0565* (2013.01); *H01M 2/18* (2013.01); *H01M 4/131* (2013.01); *H01M 4/136* (2013.01); *H01M 4/505* (2013.01); *H01M 4/525* (2013.01); *H01M 4/5825* (2013.01); *H01M 10/02* (2013.01); *H01M 10/052* (2013.01); *H01M 10/056* (2013.01); *H01M 10/0525* (2013.01); *H01M 10/0566* (2013.01); *H01M 10/0568* (2013.01); *H01M 10/4257* (2013.01);
(Continued)

(58) Field of Classification Search
CPC ........................... H04L 67/2842; H04L 67/02
USPC ....................................................... 709/217
See application file for complete search history.

(56) References Cited

U.S. PATENT DOCUMENTS 4,996,662 A 2/1991 Cooper et al.
5,181,162 A 1/1993 Smith et al.
(Continued)

OTHER PUBLICATIONS

Office Action for U.S. Appl. No. 14/812,473, dated Aug. 7, 2017, 15 pages.
(Continued)

*Primary Examiner* — Wing F Chan
*Assistant Examiner* — Leon Y Tseng
(74) *Attorney, Agent, or Firm* — Sprinkle IP Law Group

(57) ABSTRACT

A system is disclosed for delivering dynamically-rendered web experiences via implementing a provider interface in a provider framework where the interface defines supported behaviors for interfacing with external content in an external content repository, and where the interface defines at least one external object and specifies at least one method for implementing the supported behaviors for the object. The provider framework discovers supported behaviors upon instantiation of a provider implementation class embodied in implementation of the provider interface. A connection is engaged to the external repository with the supported behaviors using the interface to connect to and expose the external content. During web content delivery, the system accesses the provider connection and dynamically integrates external content with system-managed content in a delivered web page.

20 Claims, 16 Drawing Sheets

Related U.S. Application Data

(60) Provisional application No. 62/030,507, filed on Jul. 29, 2014.

(51) Int. Cl.

| | | |
|---|---|---|
| *H01M 10/42* | (2006.01) | |
| *H01M 4/131* | (2010.01) | |
| *H01M 4/525* | (2010.01) | |
| *H01M 4/505* | (2010.01) | |
| *H01M 4/58* | (2010.01) | |
| *H01M 10/0568* | (2010.01) | |
| *H01M 10/056* | (2010.01) | |
| *H01M 10/0525* | (2010.01) | |
| *H01M 4/136* | (2010.01) | |
| *H01M 10/0566* | (2010.01) | |
| *H01M 10/052* | (2010.01) | |
| *H01M 10/48* | (2006.01) | |
| *H01M 10/02* | (2006.01) | |
| *H01M 2/18* | (2006.01) | |
| *H01M 2/16* | (2006.01) | |

(52) U.S. Cl.
CPC .......... *H01M 10/48* (2013.01); *H01M 2/1686* (2013.01); *H01M 2220/30* (2013.01); *H01M 2300/0025* (2013.01); *H01M 2300/0082* (2013.01); *Y02E 60/122* (2013.01); *Y02T 10/7011* (2013.01)

(56) References Cited

U.S. PATENT DOCUMENTS

| | | |
|---|---|---|
| 5,655,130 A | 8/1997 | Dodget et al. |
| 1,001,527 A1 | 7/2018 | Jaskiewicz et al. |
| 2010/0070448 A1 | 3/2010 | Omoigui |
| 2014/0101723 A1 | 4/2014 | Wilkes et al. |
| 2016/0036935 A1 | 2/2016 | Jaskiewicz et al. |

OTHER PUBLICATIONS

Thivent et al., Difference between DTO, VO, POJO, JavaBeans?, stackoverflow.com, asked and answered Oct. 23, 2009, answer edited May 22, 2014, 5 pages.

Notice of Allowance for U.S. Appl. No. 14/812,473, dated Feb. 27, 2018, 5 pages.

EXTENSIBLE PROVIDER CONNECTION SYSTEMS, METHODS AND ARCHITECTURE

CROSS-REFERENCE TO RELATED APPLICATIONS

This application is a continuation of and claims a benefit of priority under 35 U.S.C. § 120 from U.S. patent application Ser. No. 14/812,473, filed 29 Jul. 2015, now U.S. Pat. No. 10,015,273, entitled "EXTENSIBLE PROVIDER CONNECTION SYSTEMS, METHODS AND ARCHITECTURE," which claims a benefit of priority under 35 U.S.C. § 119(e)(1) from U.S. Provisional Application No. 62/030,507, filed 29 Jul. 2014, entitled "EXTENSIBLE PROVIDER CONNECTION SYSTEMS, METHODS AND ARCHITECTURE FOR SEAMLESS PROVIDER DATA INTEGRATION." All applications referenced in this paragraph are fully incorporated by reference herein for all purposes.

TECHNICAL FIELD

This disclosure generally relates to data integration. More particularly, various embodiments representatively disclosed herein relate to systems, methods, and computer program products for efficient and seamless provider data integration via extensible and customizable provider connections.

BACKGROUND OF RELATED ART

Enterprises are complex organizations that may employ long-lived software systems that are accessible through a web-tier such as Internet web sites by a potentially unlimited number of end users. Such software systems may include content management systems configured to manage content items used by web sites.

Modern web sites must deliver an ever-increasing amount of dynamic web page content. Dynamic web page generation is a process where a server computer produces web page content just-in-time for delivery to a client computer (e.g., a web browser). Dynamic web pages differ from static web pages in that the content of a dynamic web page is determined when the web server computer receives a page request from a client computer.

Methods of creating documents from various source content have been conventionally described, e.g.:

J. Cooper, M. San Soucie, Method of Generating Document Using Tables Storing Pointers and Indexes, U.S. Pat. No. 4,996,662 (26 Feb. 1991) describes a document processing method that includes routines for controlling functions of a document manipulation system for manipulating documents.

R. Smith, D. Ting, J. Boer, M. Mendelssohn, Document Management and Production System, U.S. Pat. No. 5,181,162 (19 Jan. 1993) discloses an object-oriented document management and production system in which documents are represented as collections of components that may be combined and mapped on a page-by-page layout.

D. Dodge, S. Follett, A. Grecco, J. Tillman, Method and Apparatus for Document Production Using Common Document Database, U.S. Pat. No. 5,655,130 (5 Aug. 1997) discloses a system for producing a variety of documents from a common document database. In the described system, source documents are decomposed into encapsulated data that includes content along with classifying information about the content. Encapsulated data elements are saved to a database and can later be reassembled to form variation-specific documents.

All of the above-described systems involve decomposition of source documents into smaller components, storing the components in a database and reassembling the components to form different versions of the source document or entirely new documents. While these systems facilitate the building of variation-specific documents, they merely combine and recombine static elements in various ways. The disclosed systems do not provide any way of generating a document that incorporates dynamically discovered information. Furthermore, none of the described conventional systems concern themselves with optimizing the process of incorporating dynamic information into a delivered document by reducing required local storage resource usage.

Various other methods have been proposed for creating dynamic content in pages for delivery to a client over the Internet. For example, JAVA SERVER PAGES (Sun Microsystems, Inc. of Menlo Park Calif.) or ACTIVE SERVER PAGES (Microsoft Corporation of Redmond Wash.) create page content by having a web page's Java or C++ server code write all of the page content to the client browser via an output stream. A major failing of these solutions is that the server code and page design are both contained in the same hypertext markup language (HTML) file, making it difficult for anyone other than programmers to manage or modify the content on the pages.

Several issues arise when integrating managed objects with data from external repositories. For example, data used by conventional content management systems is also managed by the content management systems. To integrate data from external repositories into conventional content management systems (e.g., in order for enterprise users to use external data on their web site), external data often must be replicated, locally stored, and then synchronized with corresponding external repositories. This replicate-store-synchronize conventional approach to data integration is expensive, time-consuming, and complex.

As a specific example, an enterprise may have a content provider that is external and/or independent of the enterprise and that provides product-oriented data for use on the enterprise's web site. As may be readily appreciated, product-oriented data (e.g., product pricing, stock levels, etc.) is distinctly different from web site content (e.g., images, text, etc.) normally managed by conventional content management systems. For example, unlike images and text, product pricing or stock levels may change frequently. Further complicating the matter, the content provider may implement a proprietary program that tracks product-oriented data that is dynamically changing.

The necessity to replicate highly dynamic data provided by a content provider, store the replicated content, and continually synchronize content with the content provider to update rapidly changing data is not a desirable feature of convention content management approaches. Consequently, today's web content management systems continue to struggle with various issues relating to cost, complexity and efficiency involved with the management and delivery of dynamically rendered representations of external data.

SUMMARY OF DISCLOSURE

Embodiments disclosed herein provide new web content management and dynamic rendering solutions that address deficiencies associated with conventional approaches. In particular, the solutions disclosed herein may be implemented via a browser-based computer tool, referred to as Web Experience Management (WEM), for building and editing dynamically rendered web experiences. WEM supports enterprise information platforms, languages, devices, and rich media requirements. WEM also provides in-context editing of dynamically generated web pages where enterprise content may be pulled from content repositories and/or locations within/external to an enterprise. To manage enterprise content (also referred to as "managed assets," or "managed objects"), representatively disclosed WEM systems include features for authorized users to manipulate, tailor, and publish managed objects to a web site, an internal site (e.g., an intranet), or a user-facing web site, such as a newspaper or ecommerce site, etc.

A representative object of the disclosed systems and methods described herein is to make external content available to users of WEM through standard WEM services such as presentation and publishing services. Another object of the disclosed systems and methods described herein is to allow external content, or any content not managed by WEM, to be represented on a web site in such a manner that it looks and feels like local content managed by WEM. This representation of non-WEM-managed content can be thought of as virtual content inside of WEM with which a user (e.g., a web site designer, a web site visitor, etc.) can interact.

In accordance with various representative embodiments disclosed herein, a user can interact with non-WEM-managed content inside of WEM in much the same way as they would interact with WEM-managed content. A user of WEM does not need to know whether a unit of content is or is not managed by WEM. With embodiments disclosed herein, a user can use varied data—WEM-managed content and non-WEM-managed content (e.g., provider data from an external content provider)—through WEM services.

WEM content may be substantially managed within WEM and provider data can be managed independently by a content repository external to WEM. External content repositories may be disposed anywhere, e.g., different locations, different domains, different countries, etc., so long as they are accessible to WEM with any appropriate communication protocol, such as, e.g., Hypertext Transfer Protocol (HTTP). Moreover, how external provider data (i.e., non-WEM-managed content) is managed by the external repository has no effect on WEM, so long as WEM can expose and access the non-WEM-managed content (e.g., through a provider framework described herein).

These and other objects may be realized in various representative embodiments by a method comprising receipt of an implementation of a provider interface at a provider connection computer. The provider interface generally defines behaviors for interfacing with a provider system to access provider data at the provider system. Implementation of the provider interface contains one or more methods for implementing the behaviors. The provider connection computer discovers the behaviors upon receiving the implementation of the provider interface and enables integration of provider data with managed data in a page via the provider interface. Managed data is local to the provider connection computer and the provider data is external to the provider connection computer.

A representative embodiment comprises a system having a processor and a non-transitory computer-readable storage medium that stores computer instructions translatable by the processor to perform a method substantially as described herein. Another representative embodiment comprises a computer program product having a non-transitory computer-readable storage medium that stores computer instructions translatable by a processor to perform a method substantially as described herein. As will be readily appreciated, numerous other embodiments are also possible.

These and other aspects of the disclosure will be better appreciated and understood when considered in conjunction with the following description and the accompanying drawings. It should be understood, however, that the following description, while indicating various representative embodiments of the disclosure and numerous specific details thereof, is given by way of illustration and not limitation. Many substitutions, modifications, additions and/or rearrangements may be made within the scope of the disclosure without departing from the spirit thereof, and the disclosure herein contemplates and includes all such substitutions, modifications, additions and/or rearrangements.

BRIEF DESCRIPTION OF THE DRAWINGS

The drawings accompanying and forming part of this specification are included to representatively illustrate certain aspects of various embodiments. A clearer impression of the disclosed subject matter, and of the components and operation of systems provided with the disclosed subject matter, will become more readily apparent by referring to the representative, and therefore non-limiting, embodiments illustrated in the drawings, wherein identical reference numerals designate the same components. Features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
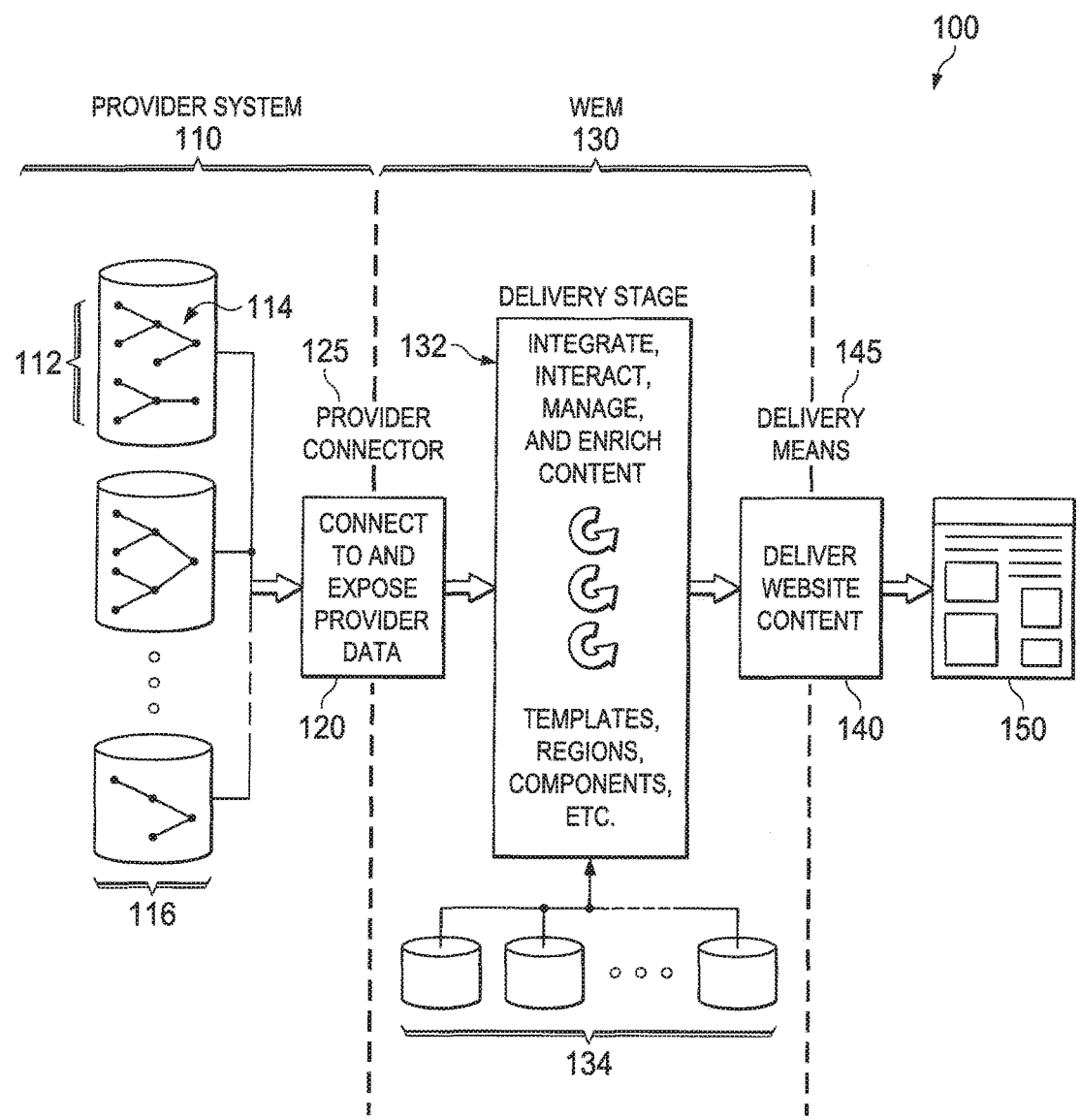
FIG. 1 depicts a functional diagram illustrating an example of a web site having external provider data and managed content in accordance with a representative embodiment disclosed herein.

FIG. 1 depicts a functional diagram illustrating an example of a system 100 having provider data 116 and managed content 134 according to various representative embodiments disclosed herein. As generally depicted in FIG. 1, provider data 116 may comprise native representations 112 of content objects 114 native to a provider system 110 that is external to web experience management (WEM) system 130. WEM system 130 may have a management stage and a delivery stage. Moving WEM-managed content from the management stage to the delivery stage may be referred to as "publishing"; however, external content (e.g., provider data 116), which is not managed by WEM, is not "published" in this sense. Rather, external content is accessed/integrated by the WEM system in the delivery stage directly for the dynamic generation of web page 150.

Figure 9:
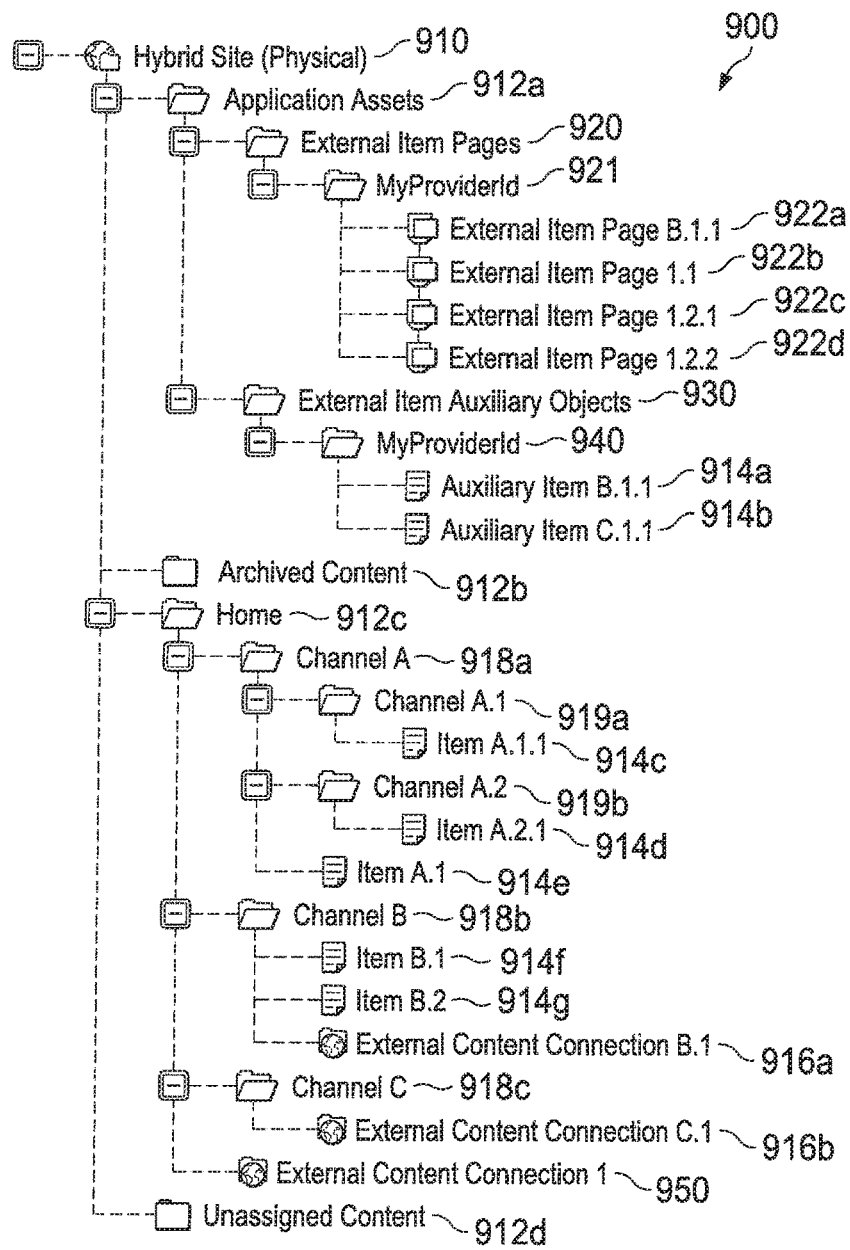
FIG. 9 depicts a diagrammatic representation of a physical model of a representative hybrid site hierarchy showing seamless provider data integration with managed content in accordance with a representative embodiment disclosed herein.
Figure 9:
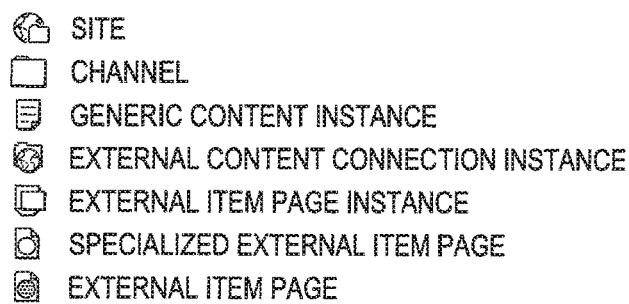
Figure 10:
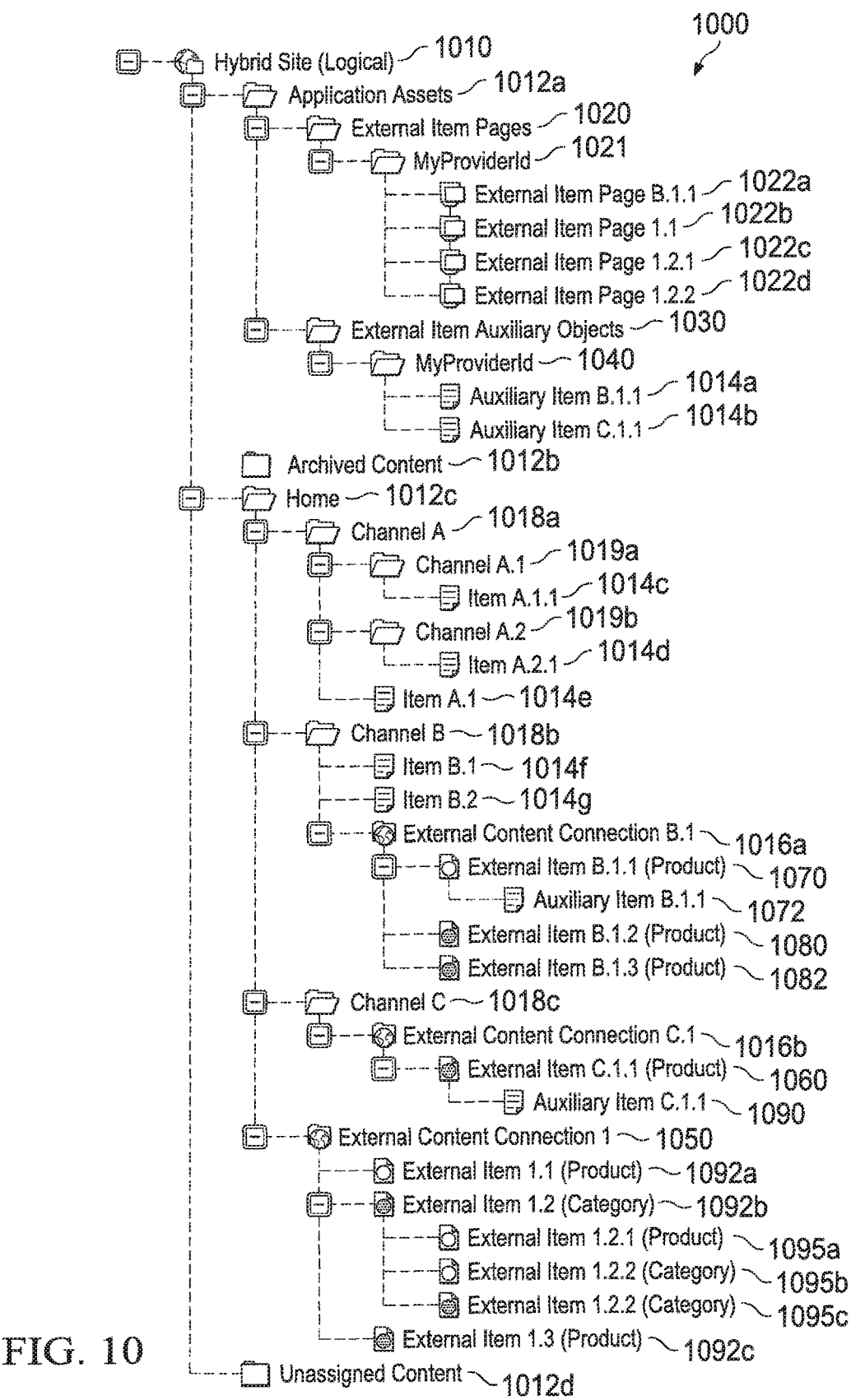
FIG. 10 depicts a diagrammatic representation of a logical model of the representative hybrid site hierarchy of FIG. 8 in accordance with a representative embodiment disclosed herein.

This difference is illustrated, e.g., in FIGS. 9 and 10, which representatively depict a physical vs. logical composition of a web site. The physical composition (e.g., FIG. 9) comprises WEM-managed objects intended for publication. The additional, "external" items representatively depicted in the logical composition (e.g., FIG. 10) do not exist within WEM, and are not "published." Rather, the external items are obtained dynamically, as needed, at the delivery stage (i.e., at runtime) by connection to and exposure of 120 external provider data 116 via provider connector 125. Notwithstanding the preceding, external items appear in the web content management ontology as if they were local components of the web site. That is to say that the presentation assets, including: any WEM-managed "enriched" content objects (see 132); any templates, regions, components, and/or the like (see 132); any metadata associated with content or content objects; and any external content objects 114, are published from the management stage to the delivery stage of WEM. Published managed objects, in accordance with various representative aspects disclosed herein, allow a web site to connect to and expose 120 provider data 116, and to integrate/interact with/manage/enrich 132 external content dynamically at the delivery stage to deliver 140 web site content 150 via delivery means 145 without the need to copy or synchronize external provider data 116 within the WEM system 130 itself.

Figure 2:
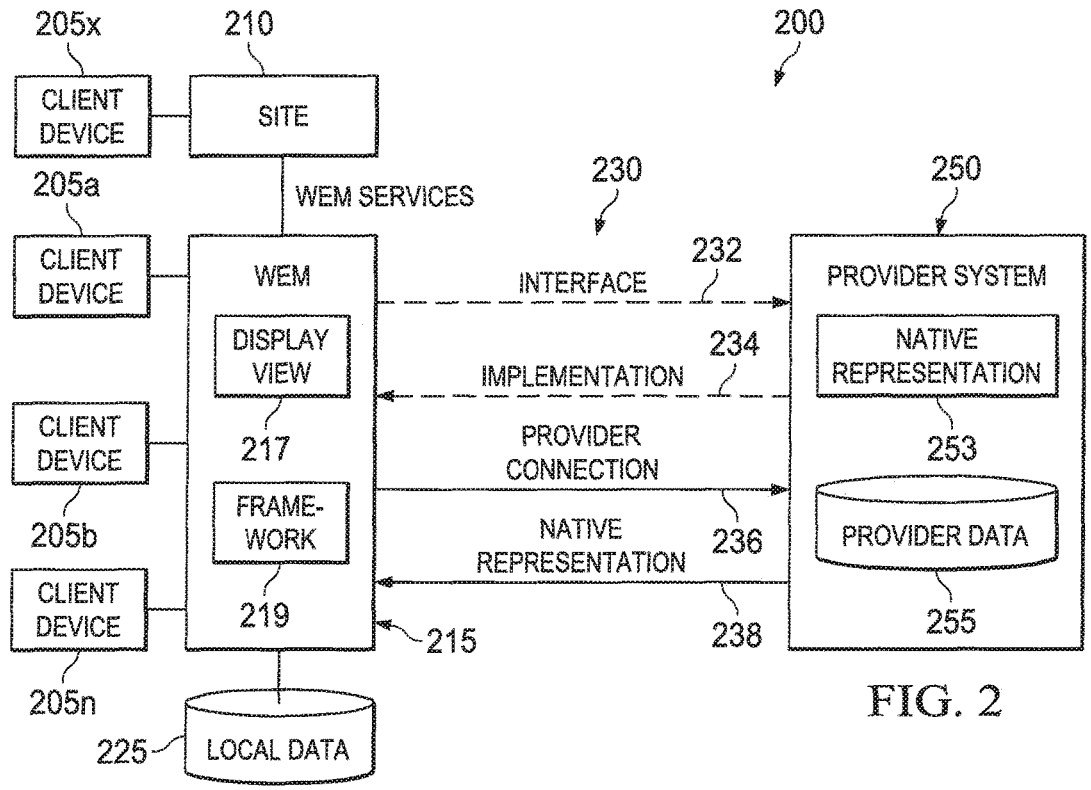
FIG. 2 depicts a diagrammatic representation of an example of a system for dynamic and seamless provider data integration with managed content in accordance with a representative embodiment disclosed herein.

FIG. 2 illustrates a diagrammatic view of a system 200 for seamless, dynamic provider data 255 integration with managed content in accordance with various representative embodiments disclosed herein. System 200 may comprise WEM 215 running on one or more server machines communicatively connected to client devices 205a, 205b, 205x, . . . , 205n over a network, such as, e.g., a private network of an enterprise. In various representative embodiments, WEM 215 may be implemented as a browser-based tool for building and editing web experiences for site 210 via WEM services. WEM services may include WEM presentation services, such as, e.g., templates and page definitions, and/or the like. In a representative aspect, site 210 may be owned and operated by the enterprise. WEM 215 may support enterprise information platforms, languages, devices, and various rich media requirements. WEM 215 may also provide in-context editing of web pages. Display view 217 of WEM 215 may allow a user at a client device to access and view managed content stored in local data store 225. Managed content may comprise digital assets owned by the enterprise. Although site 210 may be representatively depicted outside of WEM services, users interacting with external content (e.g., client device 205x) may do so in a preview mode provided by WEM 215 within the context of site 210.

As described above, WEM 215 may be embodied on one or more server machines operating in a network environment. A suitable server machine may comprise a data processing system having one or more central processing units (CPUs) or processors coupled to one or more user input/output (I/O) devices and memory devices. Examples of representative I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs), smart cards, etc. Such a data processing system may be coupled to a display, an information device, and various peripheral devices such as printers, plotters, speakers, etc. through appropriate I/O devices. Furthermore, such a data processing system may also be coupled to external computers or other devices through network interface(s), wireless transceiver(s), or other communication means coupled to a network, such as a local area network (LAN), wide area network (WAN), or the Internet. Other communication implementations are also possible.

In various representative embodiments, WEM 215 may further comprise a framework. In some embodiments, the framework may comprise pluggable provider framework 219. Pluggable provider framework 219 may reside on a server machine, generally referred to as a provider connection computer of provider system 250.

In some embodiments, WEM 215 may be communicatively connected to provider system 250 via communication means 230. Provider system 250 may comprise provider data 255 stored in a provider data store external to WEM 215. Provider data 255 stored in provider data store may comprise native representation(s) 253 native to provider system 250. Communication interactions 232, 234, 236, and 238 between WEM 215 and provider system 250 are explained below with reference to FIG. 3.

Figure 3:
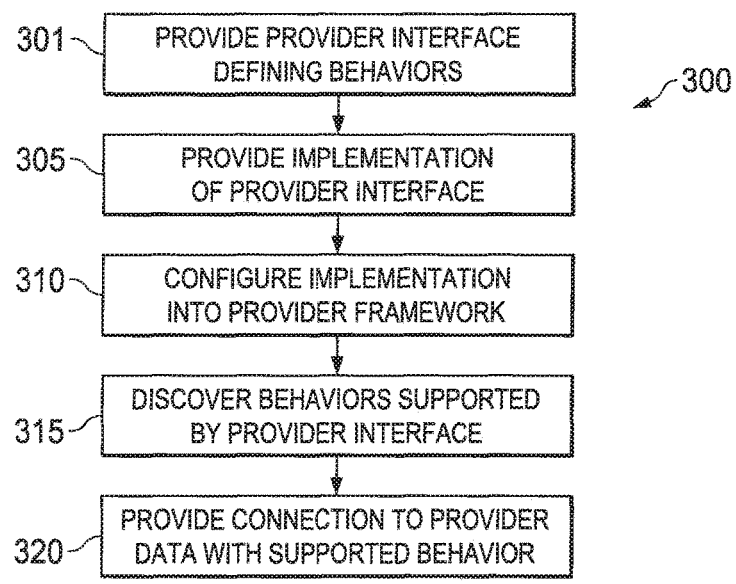
FIG. 3 depicts a flow diagram illustrating an example of a method for dynamic and seamless provider data integration with managed content in accordance with a representative embodiment disclosed herein.

FIG. 3 depicts a flow diagram illustrating an example of a method 300 for seamless provider data integration with managed content in accordance with various representative embodiments disclosed herein. With reference to FIG. 2, pluggable provider interface 232 (also referred to herein as "WEM interface") may be provided to provider system 250 (step 301). In representative embodiments, WEM interface 232 may be provided as a software development kit (SDK), including, e.g., Javadoc and JARs (i.e., files in Java ARchive format) of compiled Java classes. Javadoc is a documentation generator for generating application-programming interface (API) documentation in HTML format from Java source code and is known to those skilled in the art. Those skilled in the art will appreciate that a plurality of pluggable provider interfaces may be presented to multiple provider systems. Accordingly, FIG. 2 is exemplary and not limited to a single pluggable provider interface and/or a single provider system.

With reference again to FIG. 2, provider system 250 may provide implementation 234 of pluggable provider interface 232 (step 305). Implementation 234 may consist of Java classes of pluggable provider interface 232. Implementation 234 may be configured into pluggable provider framework 219 as a provider representing provider system 250 (step 310). In various representative embodiments, such an implementation may be manually added (i.e., deployed) to WEM as a Jar file using WEM configuration services. The provider framework is "pluggable" in the sense that service provider organizations can declare and configure an implementation of a provider interface that implements WEM provider framework interfaces and has some set of required properties for proper functioning. This can be done dynamically, meaning that service provider organizations or the like can obtain or be provided with a set of WEM provider framework interfaces and, substantially independently, a party can develop an implementation of a provider interface that implements one or more of the provided WEM provider framework interfaces. Organizations can provide the implementation to WEM that is then configured into the provider framework. Although a provider is configured in WEM, the configuration step can occur at any time after WEM installation. For example, a party can implement a provider and configure (or register) it with WEM (e.g., via a configuration console provided by WEM, as described later herein).

Implementation 234 of pluggable provider interface 232 may contain properties specific to provider system 250 or to the type of provider represented by provider system 250. As part of one of these properties, the implementation may indicate certain behaviors. For instance, the implementation may indicate when a content object may be handed back from a provider repository to a display view of WEM, what the object type of a content object is, etc. An object handed back from a provider repository need not be a WEM object and can be a custom created object; e.g., a JavaBean, a JavaScript Object Notation (JSON) string, or any other solution. It does not matter to WEM what that object looks like or what it contains, as long as it can be represented in Java so it can be handed to display view 217.

Upon implementation 234 of pluggable provider interface 232 being configured into pluggable provider framework 219, behaviors can be discovered by pluggable provider framework 219 (step 315). This discovery process may be automatic and/or dynamic. The automatic/dynamic discovery of provider implementation behaviors occurs within WEM 215 upon instantiation of the provider implementation classes, at which point their behaviors are determined based on the set of pluggable interfaces they implement. Not all provider implementations may implement all interfaces. For instance, a provider may or may not implement an interface that is session oriented. If so, WEM can automatically provide a session-based caching of the provider's serializable "Context," declared as part of that interface.

Based at least in part on the behaviors supported by the particular implementation 234 of pluggable provider interface 232 (specific to provider system 250 in the example of FIG. 2), pluggable provider framework 219 may operate to create provider connection 236 (step 320). Once provider connection 236 is established between WEM 215 and provider system 250, provider data 255 stored in a data store of provider system 250 can be accessed via provider connection 236 and represented in display view 217 so that they can be seamlessly and dynamically integrated with managed content stored in local data store 225. A page containing both the non-WEM-managed provider data and the WEM-managed content may be an example of such seamless, dynamic integration.

The seamless and dynamic integration of non-WEM-managed external content and WEM-managed content can have many uses. As representatively illustrated in FIG. 4, some embodiments may be suitable configured or otherwise adapted to integrate external content not managed by WEM and/or stored at the backend where web experiences are built and edited via WEM services. Furthermore, as representatively illustrated in FIG. 5, such web experiences can be delivered to web users at the frontend via external facing web site(s). The dynamic and seamless integration of non-WEM-managed content and WEM-managed content is transparent to web users. From a user's perspective, there is no difference in their web experience whether they are interacting with non-WEM-managed external content or WEM-managed content.

Figure 4:
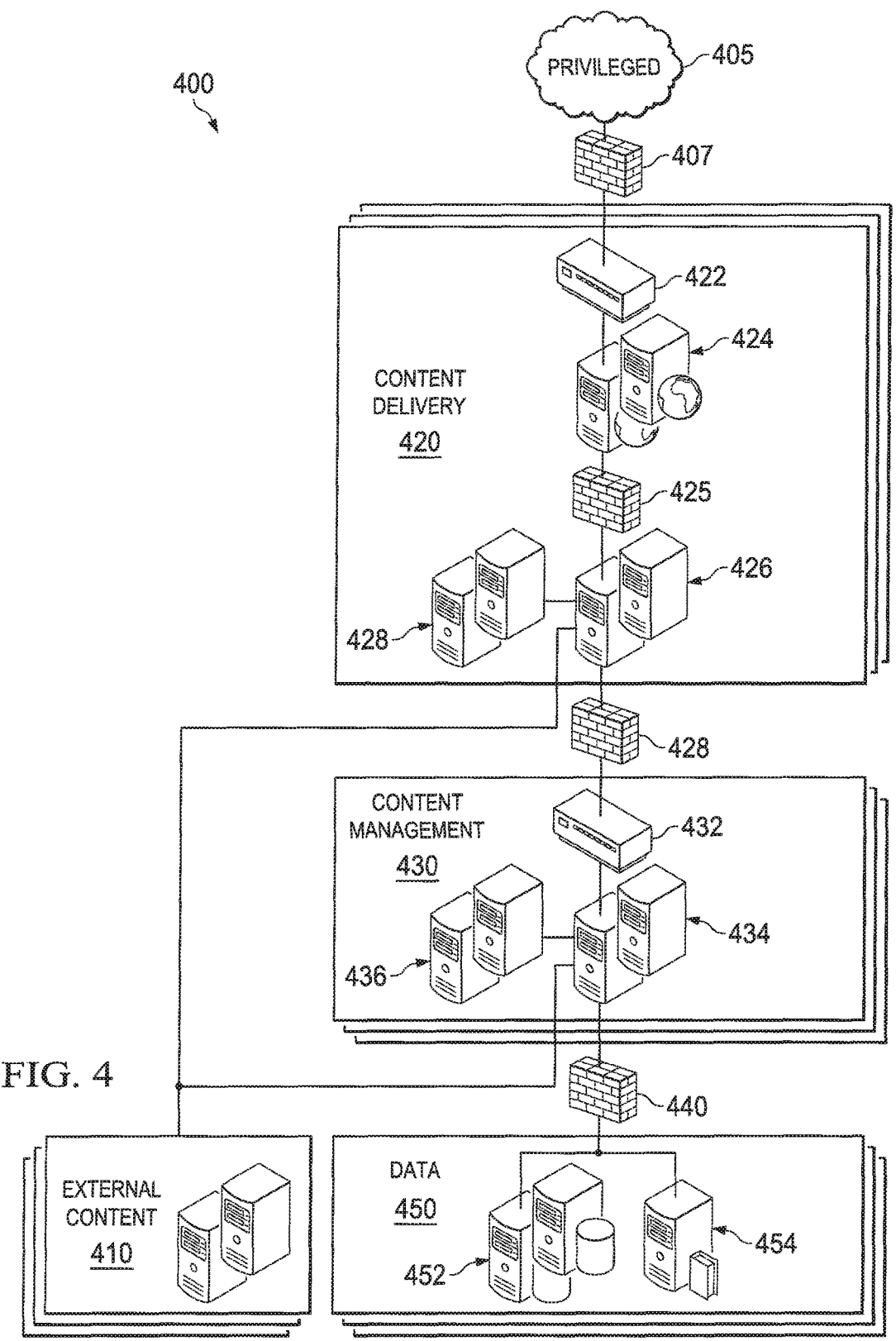
FIG. 4 depicts a diagrammatic representation of a web site topology for the backend of an enterprise computing environment where provider data can be dynamically and seamlessly integrated with managed content in accordance with a representative embodiment disclosed herein.

As generally illustrated in FIG. 4, WEM service backend 400 may comprise various components, including, e.g., development instance of external content 410, development instance data 450, development instance content management 430, and pre-publication web site content delivery 420. WEM service backend components 410, 420, 430, 450 may be located, e.g., behind privileged cloud 405 and firewall 407.

Development instance of external content component 410 may comprise simulated or actual external content for web site construction using WEM service backend 400 for pre-publication development. Development instance data component 450 may comprise high-availability database(s) 452 and directory server(s) 454 located behind data firewall 440. Development instance content management component 430 may comprise shared search server(s) 436, cluster and deployment agent server(s) 434, and content switch secure-sockets-layer (SSL) accelerator 432 located behind content management firewall 428. Pre-publication web site content delivery component 420 may comprise search server(s) 428, application server(s) 426, content delivery intermediate firewall 425, web server(s) 424, and content switch SSL accelerator 422 located behind content delivery firewall 407.

Figure 5:
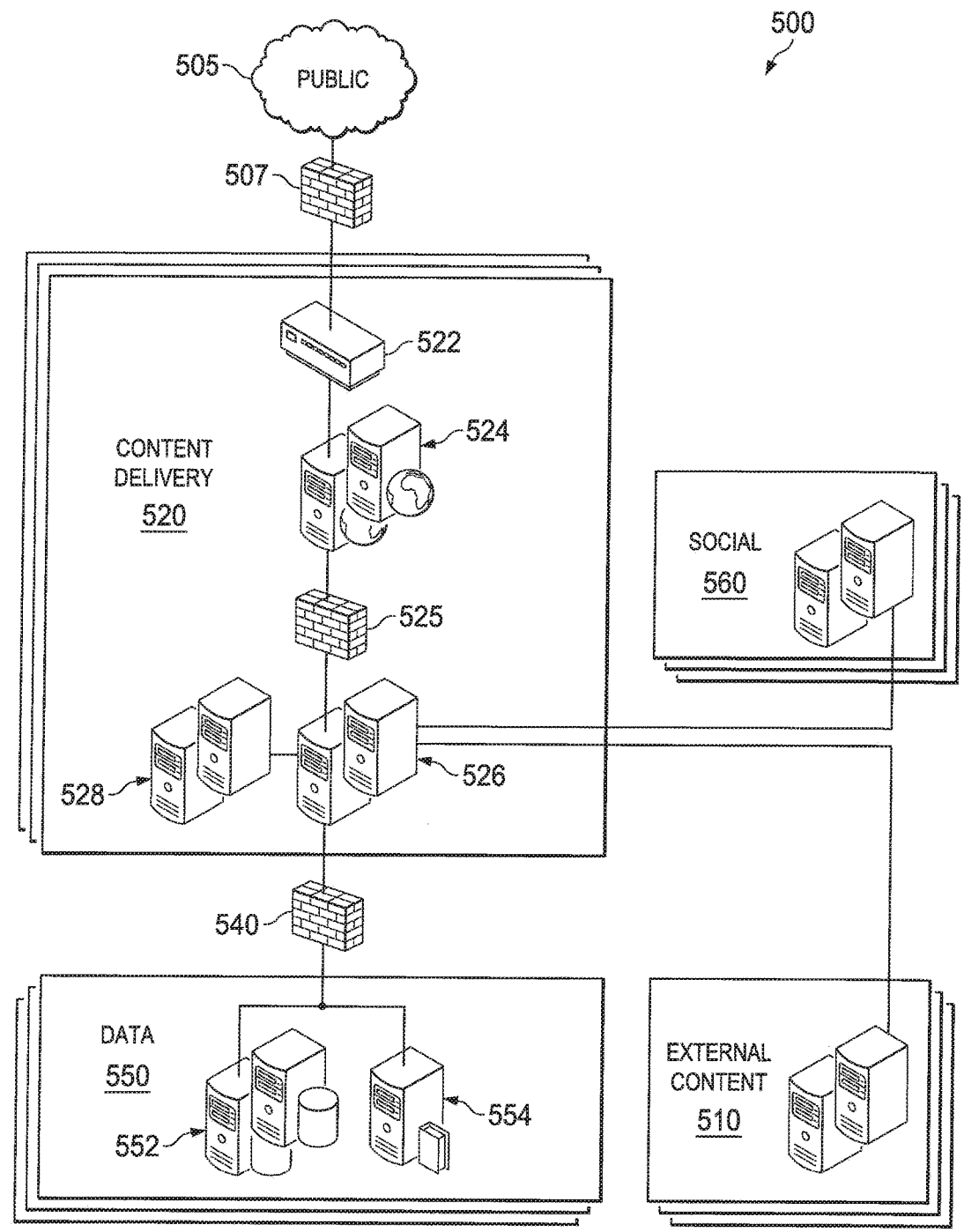
FIG. 5 depicts a diagrammatic representation of a web site topology for the frontend of an enterprise computing environment where managed content and integrated provider data can be delivered to external facing web site(s) in accordance with a representative embodiment disclosed herein.

As generally illustrated in FIG. 5, WEM service frontend 500 may comprise various components, including, e.g., delivery instance of external content 510, delivery instance data 550, delivery instance web site content delivery 520, and user-generated content social component 560. WEM service frontend components 510, 520, 550, 560 may be located, e.g., behind public cloud 505 located behind firewall 507.

Delivery instance of external content component 510 generally comprises external content for dynamic web site construction using WEM service frontend 500 for publication. Delivery instance data component 550 may comprise high-availability database(s) 552 and directory server(s) 554 located behind data firewall 540. Delivery instance web site content delivery component 520 may comprise search server(s) 528, application server(s) 526, content delivery intermediate firewall 525, web server(s) 524, and content switch SSL accelerator 522 located behind content delivery firewall 507. User-generated content social component 560 may be configured to all users to provide product reviews, comments, social media links, etc.

Figure 6A:
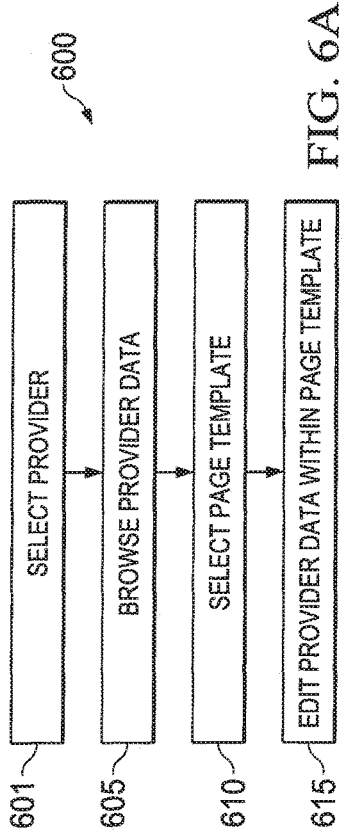
FIG. 6A depicts a flow diagram illustrating an example of a method for integrating provider data of a selected provider in accordance with a representative embodiment disclosed herein.

At the backend, when a WEM user is building and editing web experiences via WEM services, they can choose various external provider data from non-WEM provider(s) connected to WEM via provider connection(s) established as described above. FIG. 6A depicts a flow diagram illustrating a representative method 600 for using integrated provider data according to various representative embodiments disclosed herein.

Figure 6B:
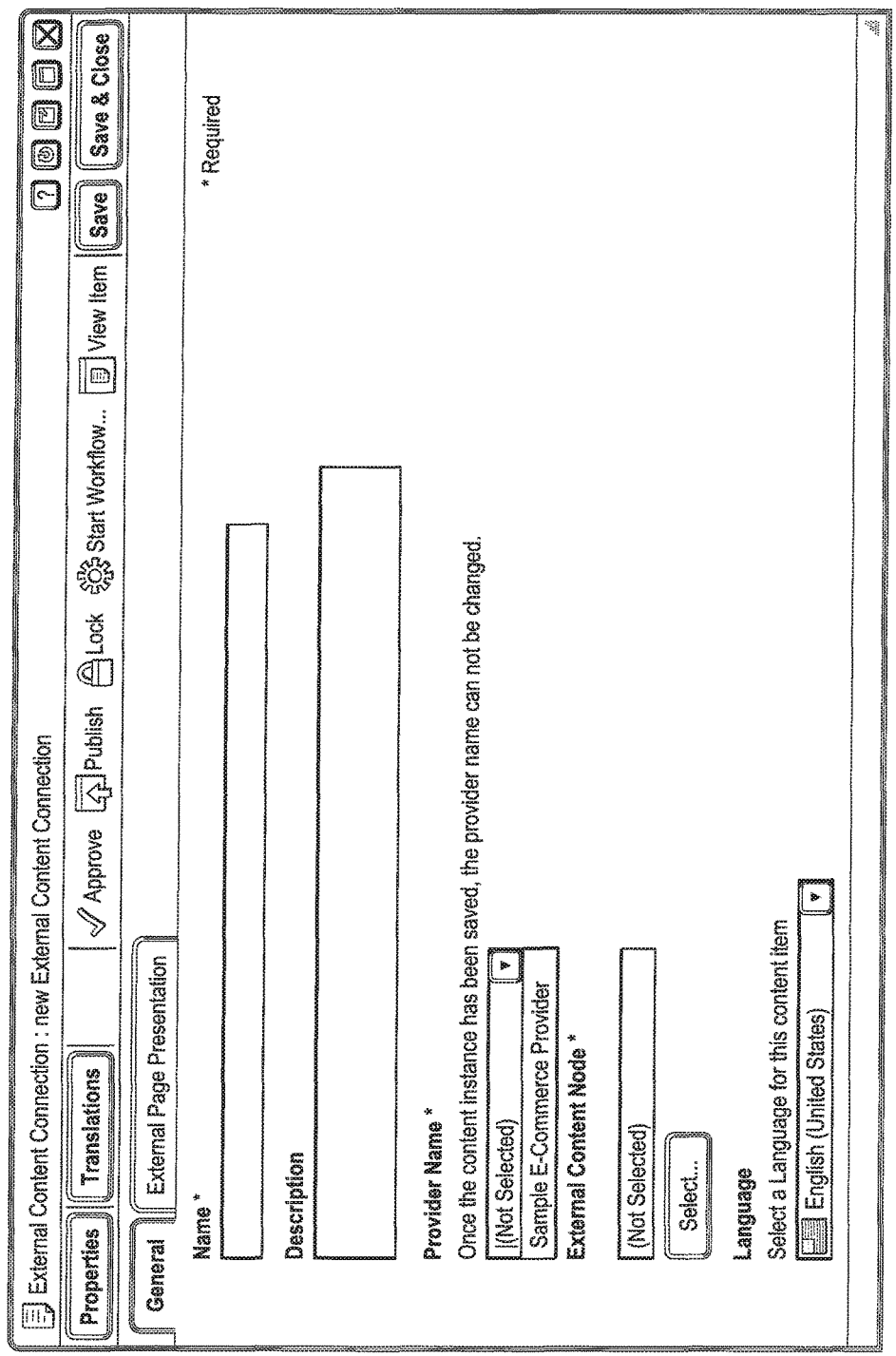
FIG. 6B depicts a diagrammatic representation of a user interface showing selection of a configured provider in accordance with a representative embodiment disclosed herein.

In representative embodiments, a WEM user may select a provider from a list of providers in, e.g., a pluggable provider framework provided by WEM (step 601). FIG. 6B depicts a diagrammatic representation of a user interface showing selection of a configured provider. The WEM user may browse external provider data via a provider connection corresponding to the particular provider (step 605). The provider connection may implement particular behaviors specified by, e.g., a provider repository associated with the provider, as explained above. The WEM user may select an appropriate page template for editing the provider data (step 610). The provider data can be edited within the selected page template that is displayed to the WEM user in a display view (step 615). From the perspective of the WEM user, the user is editing the provider data; however, as explained below, they are actually manipulating native representation(s) of the provider data presented in the display view of WEM.

From the perspective of WEM, a "provider" comprises an implementation of a provider interface (as described above) that will communicate with an external repository and that presents an API that WEM can use (i.e., a WEM API). From a system perspective, therefore, a provider comprises Java interfaces (at least in some representative embodiments) that are implemented as code that runs inside of server machine(s) embodying WEM independent of an external repository and that communicate with the external repository to access provider data stored in the external repository.

As those skilled in the art will appreciate, an interface in the Java programming language is an abstract type used to specify an interface (in the generic sense of the term) that classes implement. An example of a representative class diagram implementing a set of Java interfaces 700 is illustrated, e.g., in FIG. 7. Java interfaces cannot be instantiated; rather, they are implemented. Java interfaces do not contain method implementations, but rather contain method signature and constant declarations. Accordingly, a class that implements an interface must generally implement all of the methods described in the interface, or alternatively be an abstract class.

Figure 7:
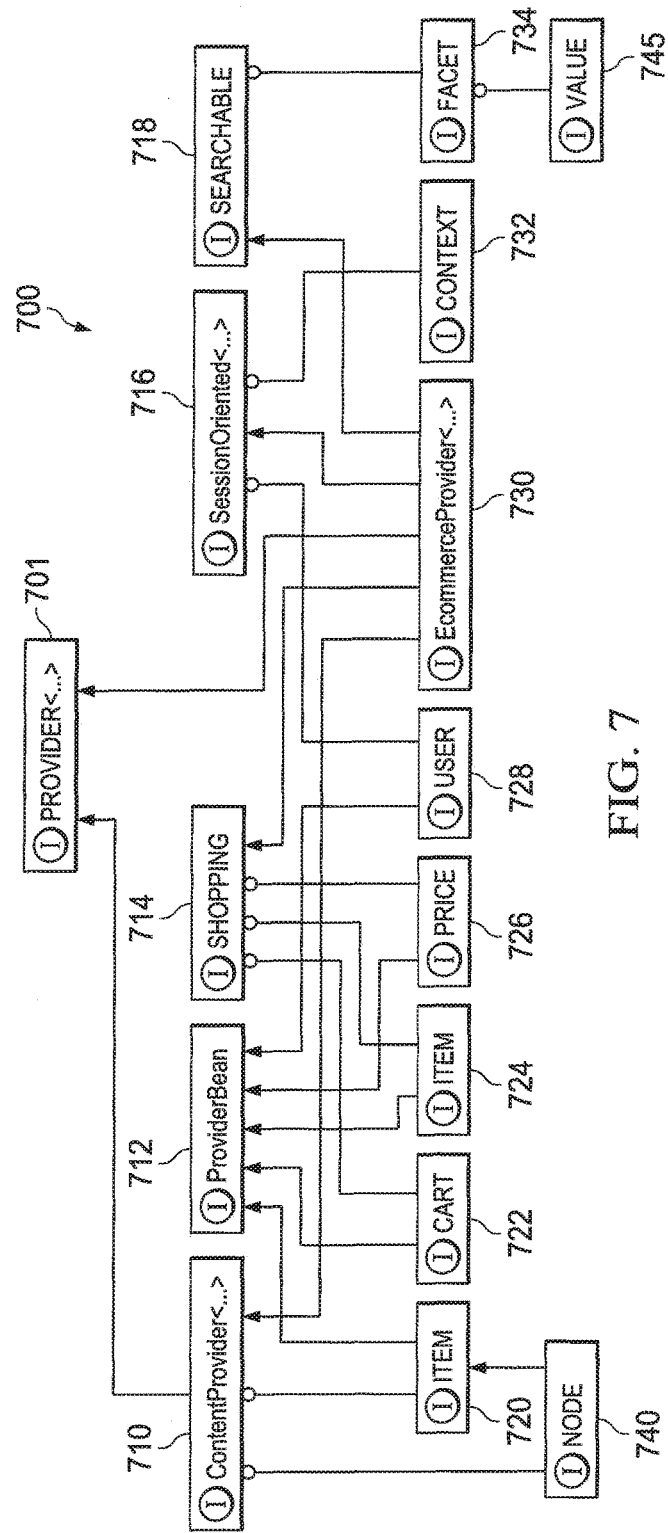
FIG. 7 depicts a class diagram illustrating implementation of a set of interfaces for a pluggable provider framework in accordance with a representative embodiment disclosed herein.

A representative class architecture, as generally illustrated in FIG. 7, may include external resource PROVIDER< . . . > interface 701. ContentProvider< . . . > interface 710 extends PROVIDER< . . . > interface 701, and contains ITEM interface 720 and NODE interface 740. ITEM interface 720 is extended by NODE interface 740, and itself extends ProviderBean interface 712. SHOPPING interface 714 contains CART interface 722, ITEM interface 724, and PRICE interface 726, all of which also extend ProviderBean interface 712. EcommerceProvider< . . . > interface 730 extends ContentProvider< . . . > interface 710, SHOPPING interface 714, SessionOriented interface 716, and SEARCHABLE interface 718. SessionOriented< . . . > interface 716 contains USER interface 728 and CONTEXT interface 732. USER interface 728 extends ProviderBean interface 712. SEARCHABLE interface 718 contains FACET interface 734, which itself contains VALUE interface 745.

As those skilled in the art will also appreciate, it would be unusual to integrate two or more different systems owned and operated by two or more different entities. Although it may be possible to build a custom integration of two (or more) distinct systems, the resulting system generally cannot be easily integrated with other providers after it is built and deployed (i.e., made available on the market). The pluggable provider framework disclosed herein provides a layer of interfaces for WEM that addresses this deficiency associated with the prior art. Any system that can be characterized through provider interfaces in how the system is exposed to WEM users can be added (i.e., plugged into the provider framework) as a provider. This extensibility advantageously provides for ease of integration of WEM with external sources.

To characterize a system (e.g., a provider repository), arbitrary types may be defined in an implementation for association with any given item or node. The resulting types provide integration to various aspects of WEM's presentation framework.

Within WEM, a component of content (e.g., managed content local to WEM) may be described by a content type that defines the structure of the data. WEM users can define different page templates in WEM that might provide better correspondence for a given structure; e.g., content type A may have a first kind of page template, content type B may have a second type of page template, etc. In certain representative embodiments, this feature may be extended to external content by virtue of, e.g., a string-type field in an implementation.

Different content providers may have different implementations of Java interfaces provided by an operator of WEM. An implementation can implement the minimum amount of access locations or touch points (also referred to as "jump off points" or "navigation mount point," see, e.g., FIG. 9 and FIG. 10) through which a file system of a provider repository may be explored. The implementation may define a containment and items/folders of the file system and may describe how to navigate the file system; for instance, what is the root node, how to access a leaf node, etc. WEM does not need to know the structure of each component of provider data in the external provider repository. WEM just needs to know the item type of that component of provider data so that a proper template may be selected. In this way, a WEM user can build a web site to incorporate provider data from external repositories, declare how data is to be exposed (e.g., via JavaBeans), and WEM can bring that provider data in and expose a native way to interact with the data.

Figure 8:
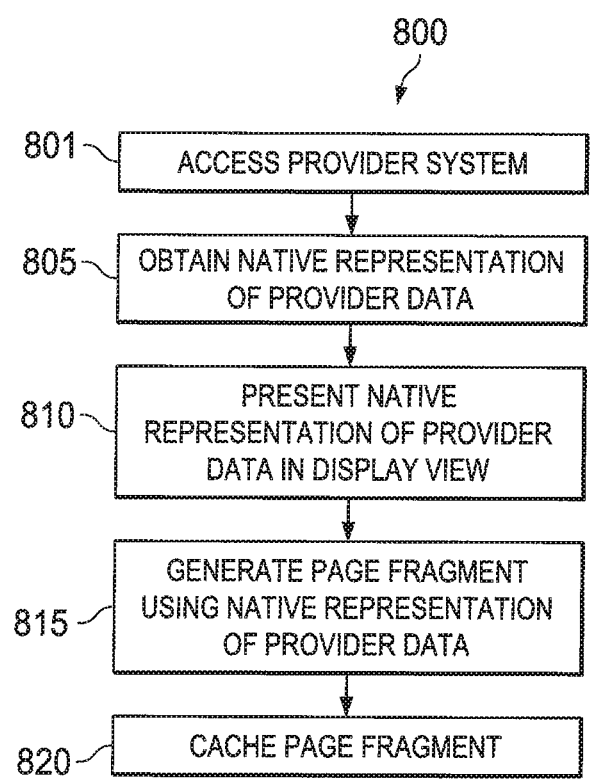
FIG. 8 depicts a flow diagram illustrating an example of a method for accessing provider data in accordance with a representative embodiment disclosed herein.

FIG. 8 depicts a flow diagram illustrating a method 800 for accessing provider data according to various representative embodiments disclosed herein. In some embodiments, a WEM user may access a provider system via a provider connection (step 801) (e.g., provider system 250 and provider connection 236 shown in FIG. 2). Instead of retrieving actual provider data, native representation(s) (e.g., native representation 253 shown in FIG. 2) of the actual provider data may be obtained (step 805) using methods implementing the particular behaviors specified by the provider system. The native representation(s) may be displayed in a display view (step 810) (e.g., display view 217 shown in FIG. 2). In this way, user-definable objects (e.g., any Java object) can be passed back from a provider system external to WEM and displayed in a display view of WEM. Such a display view may be provided to the WEM user via a browser-based application executing on a client device. Through the native representation(s) of the provider data displayed in the display view, the WEM user can generate page fragments (step 815) representing the provider data, which resides at the provider system and which is not managed by WEM. In some embodiments, such page fragments may be in Hypertext Markup Language (HTML). The page fragments so generated may optionally be cached (step 820), for instance, at a data storage location local to the WEM system, and managed by the WEM system in the same manner as content managed by WEM.

Those skilled in the art will appreciate that provider data may have various representations. In certain representative embodiments, a native representation may comprise a JavaBean that encapsulates a plurality of objects into a single object. The plurality of objects may be presented in the display view via WEM presentation services without manipulation of the JavaBean. Alternatively, conjunctively or sequentially, a native representation may comprise a JSON string. The JSON string may consist of, e.g., attribute-value pairs. The attribute-value pairs may be presented in the display view via WEM presentation services without manipulation of the JSON string.

A web site containing non-WEM-managed external content integrated with WEM-managed content, as described above, may be referred to as a hybrid site. The hierarchy of a hybrid site can be illustrated from a physical perspective and a logical perspective.

FIG. 9 depicts a diagrammatic representation of physical model 900 of a representative hybrid site hierarchy and FIG. 10 depicts a diagrammatic representation of logical model 1000 of a representative hybrid site hierarchy. As generally illustrated in FIG. 9 and FIG. 10, a hybrid site has local content (managed objects) and external content (non-WEM-managed, external data); however, for each distinct object in a provider system, there may not be an analogous object in WEM. The representative hybrid site hierarchy shows managed objects and jump off points to external items. Each jump off point in the exemplary hybrid site hierarchy comprises a node having an external content connection type. An example of a node representing a provider connection is generally depicted, e.g., in FIG. 16. A provider connection gives WEM information about where to get external data and from what provider. A provider connection can facilitate fetching of objects and data (included metadata) from the provider's repository and display, and make accessible that external content via presentation services in the same manner as local content within WEM.

As generally depicted, e.g., in FIG. 9, physical model 900 may comprise: site 910; channels 912a, 912b, 912c, 912d, 918a, 918b, 918c, 919a, 919b, 920, 921, 930, 940; content instances 914a, 914b, 914c, 914d, 914e, 914f, 914g; content connection instances 916a, 916b, 950; and external content page instances 922a, 922b, 922c, 922d.

Site 910 has local content (i.e., managed objects) and external content. The depicted physical model 900 shows managed objects (local content) and external content (external items). External item pages 922a, 922b, 922c, 922d are similar to managed items 914c, 914d, 914e, 914f, 914g, but are associated with external content. External content connection jump off point 950 points to external content and links to a static location in the external hierarchy. Each jump off point is a managed object; however, in the case that the jump off point is a content item, it may or may not have a specialized page associated with it.

As generally depicted, e.g., in FIG. 10, logical model 1000 may comprise: site 1010; channels 1012a, 1012b, 1012c, 1012d, 1018a, 1018b, 1018c, 1019a, 1019b, 1020, 1021, 1030, 1040; content instances 1014a, 1014b, 1014c, 1014d, 1014e, 1014f, 1014g, 1072, 1090; content connection instances 1016a, 1016b, 1050; external content page instances 1022a, 1022b, 1022c, 102d; and external item pages 1060, 1070, 1080, 1082, 1092a, 1092b, 1092c, 1095a, 1095b, 1095c.

Site 1010 has local content (i.e., managed objects) and external content. The depicted logical model 1000 shows managed objects (local content) and external content (external items). External item pages 1022a, 1022b, 1022c, 1022d are similar to managed items 1014c, 1014d, 1014e, 1014f, 1014g, but are associated with external content. External content connection jump off point 1016a logically contains external remote items (e.g., nodes or leaves) that do not have backing managed objects. External item 1070 may have a page object for enriching the page. If an item has a page, it is referred to as a "specialized page"; alternatively, it is just a page (e.g., only a template). Each external item may have one or more associated managed objects (auxiliary items) of any type, but is not required to have a specialized page. External content (e.g., 1095a, 1095b, 1095c) may be considered an "external item." WEM is type-agnostic, except for template lookup. There is a template for each type. JavaBean API can support both a terminal item or an item that may contain other items (a node). External content hierarchies can be of arbitrary depth with specialized pages at any point, independent of inheritance.

A content type is generally a description of a particular object and its attributes and properties. For example, a story content type has attributes such as title, body, name, etc., and there may be multiple instances of this type. Likewise, a provider connection has certain attributes such as title, mount path, provider, etc. An external content connection type defines what attributes instances of that content type have and describes the data that it needs. However, such an external content connection type is a system content type and WEM users are not expected to define the structure of and/or instantiate or change system content types. Instead, users create instances of a provider connection object having the external content connection type, each pointing to a starting point at a provider system external to WEM and each describing how to present non-WEM-managed content within WEM.

Specifically, to create a node, an instance of an external content connection type may be created and placed in a site tree with other components of content or channels. When a user navigates to the node (a jump off point), the user can start to navigate an external provider system. The provider connection (an instance of an external content connection type for the provider system) furnishes the user with the location where the external content is to be pulled from the external provider system. The provider system may not wish to expose its entire repository; in that case, the provider connection may specify a root node for a portion of the provider's repository, such as a particular branch of a provider's site hierarchy, file system, or the like. Consequently, the node may represent a micro-site within the provider's site.

Figure 11:
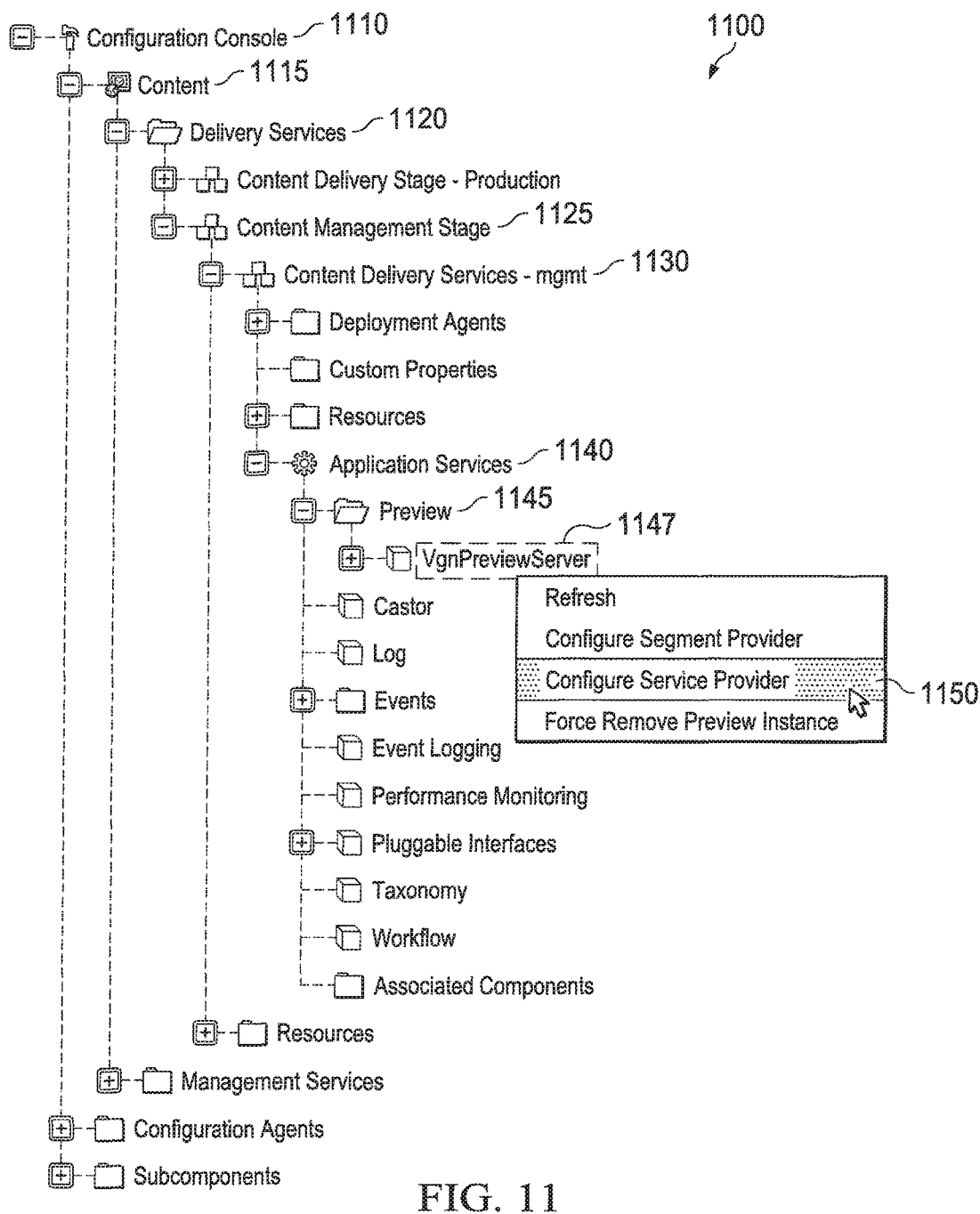
FIG. 11 depicts a diagrammatic representation of a portion of a WEM user interface showing an example of invoking a provider registration process in accordance with a representative embodiment disclosed herein.

To add (plug) a provider into the pluggable provider framework (in an ad hoc manner), the WEM system provides a configuration console 1110 through which provider registration may be performed. FIG. 11 representatively depicts a diagrammatic illustration of a portion of a WEM user interface 1100 showing one example of invoking a provider registration process according to some embodiments disclosed herein. The provider registration process can be dynamic. The provider registration process will ask for provider identity information and properties necessary for the provider, such as host, protocol, password, etc. and determine what services the provider supports—external content, search, shopping, etc. Configuration console 1110 may comprise a hierarchical structure having components, such as, e.g., Content feature 1115, Delivery Services feature 1120, Content Management Stage feature 1125, Content Delivery Services feature 1130, Application Services feature 1140, Preview feature 1145, and Preview Server feature 1147. In a representative example, right-clicking on Preview Server feature 1147 may be configured to permit a user to select, e.g., an option to "Configure [a] Service Provider" 1150.

Figure 12:
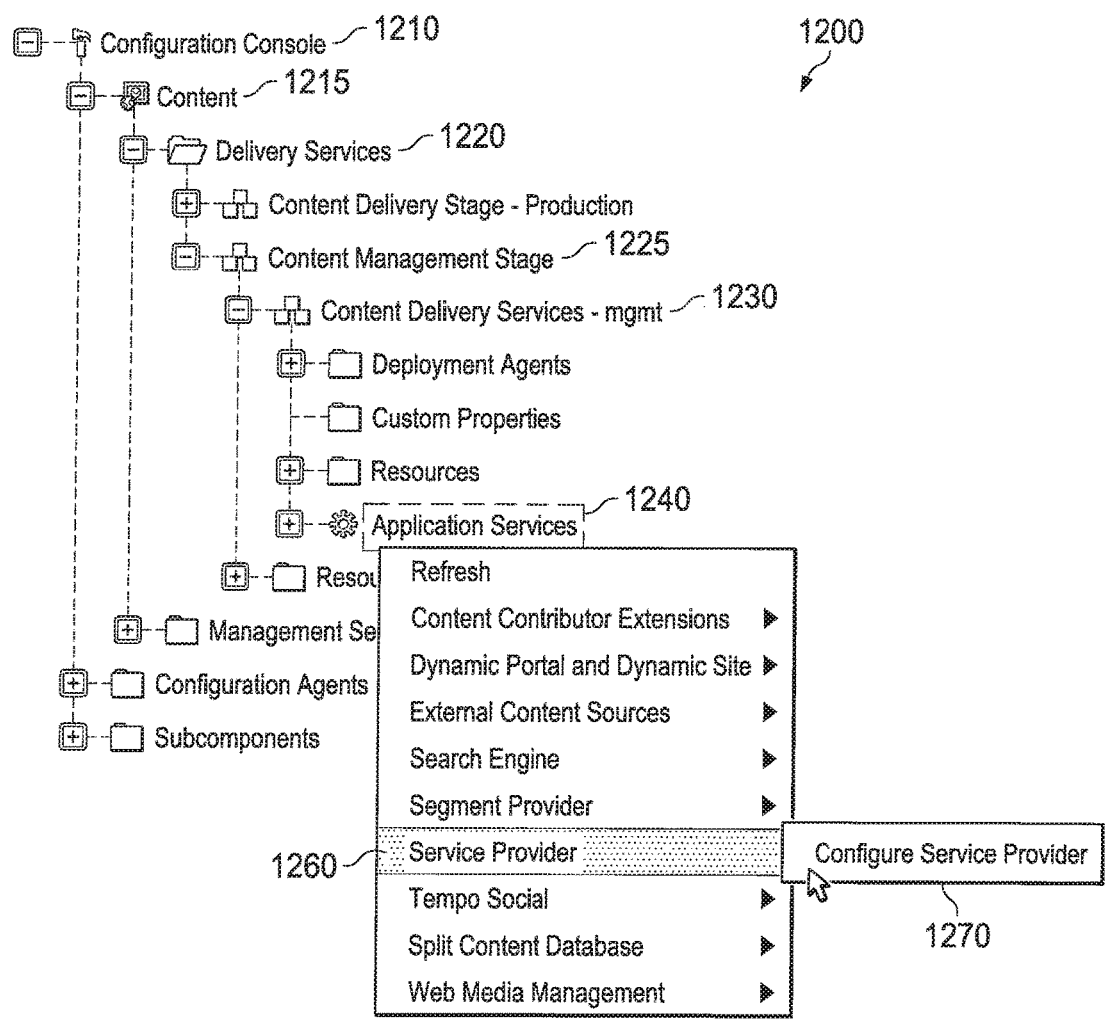
FIG. 12 depicts a diagrammatic representation of a portion of a WEM user interface showing another example of invoking a provider registration process in accordance with a representative embodiment disclosed herein.

FIG. 12 representatively depicts a diagrammatic illustration of a portion of a WEM user interface 1200 showing another example of invoking a provider registration process according to some embodiments disclosed herein. Configuration console 1210 may comprise a hierarchical structure having components, such as, e.g., Content feature 1215, Delivery Services feature 1220, Content Management Stage feature 1225, Content Delivery Services feature 1230, and Application Services feature 1240. In a representative example, right-clicking on Application Server feature 1240 may be configured to permit a user to select, e.g., an option to (for a Service Provider 1260) "Configure [a] Service Provider" 1270.

Figure 13:
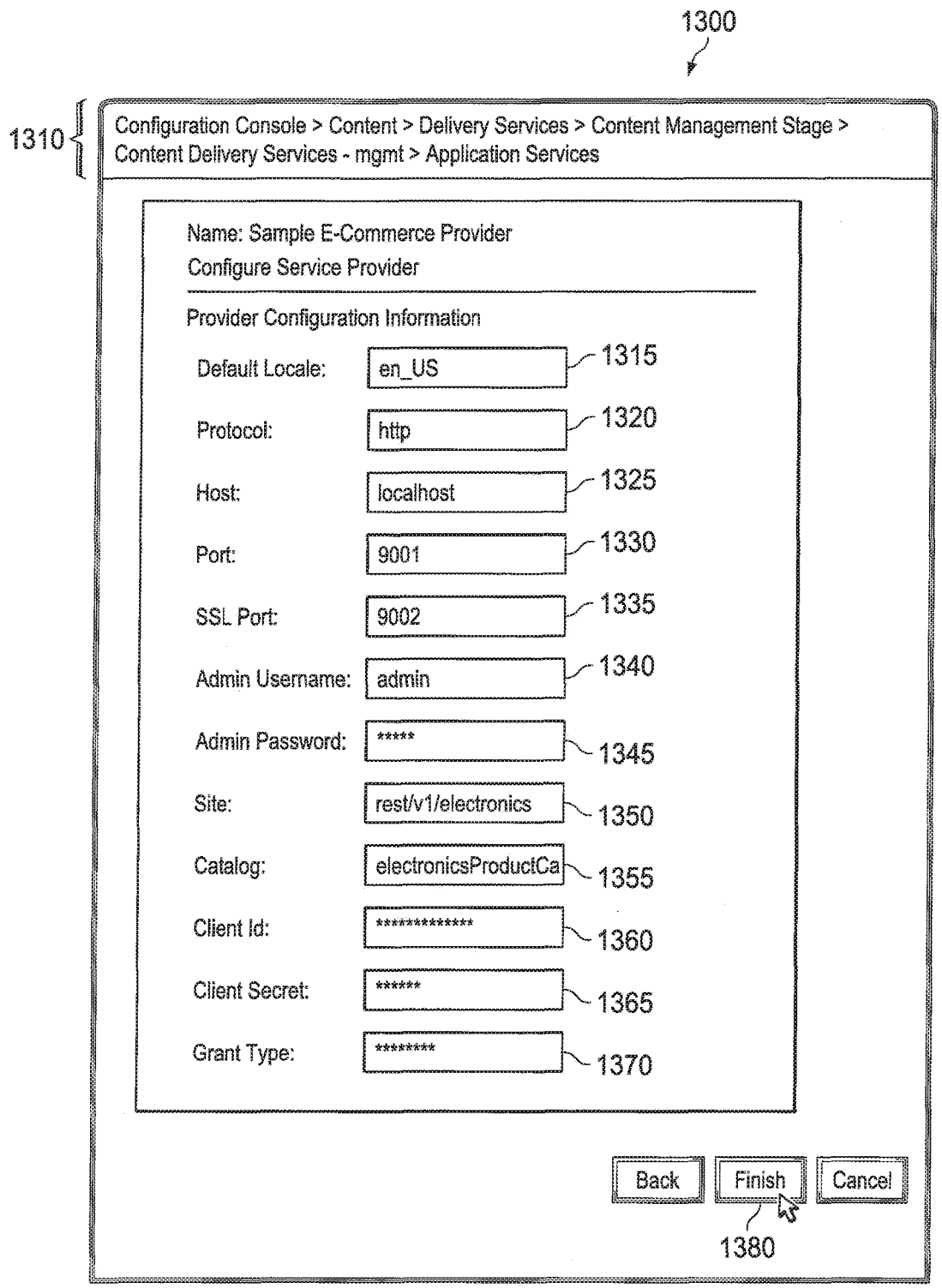
FIG. 13 depicts a diagrammatic representation of a WEM user interface showing an example of configurable provider information in accordance with a representative embodiment disclosed herein.

FIG. 13 representatively depicts a diagrammatic illustration of a WEM user interface 1300 showing an example of configurable provider configuration properties according to some embodiments disclosed herein. Such configuration properties may include, e.g., Default Locale field 1315, Protocol field 1320, Host field 1325, Port field 1330, SSL port field 1335, Admin Username field 1340, Admin Password field 1345, Site field 1350, Catalog field 1355, Client Id field 1360, Client Secret field 1365, and Grant Type field 1370. WEM user interface 1300 may be further configured to provide a navigation tree 1310 indicating what portion of the configuration console the user is modifying, and "Finish" button 1380 to save changes made to the configuration properties.

In certain representative embodiments, a method for dynamic and seamless provider data integration with managed content may further comprise generating an instance of a provider connection type defined by an external provider system, configuring a provider connection to a node in the provider system using the provider connection type instance, and placing the provider connection type instance with the managed data in a site tree comprising the page. In some embodiments, the provider connection type instance may define a navigation mount point relative to a hierarchy residing at the provider system. In some embodiments, the method may further comprise configuring a page template for the provider data in the page based on, e.g., the provider connection type instance.

A local object managed by the WEM system and an external item managed by an external source need not find any correspondence between each other. As discussed above, a WEM-managed object is described by content type, including its attributes and types of data described in it; however, the WEM system need not have specific knowledge about a non-WEM-managed object residing at a provider system (e.g., an external item stored and managed by an external content provider). Although the WEM system may require some bookkeeping information provided at the interface (e.g., whether an external item is a single item such as an image or a type of container such as a folder, a zip file, a directory, etc. that can contain other objects, etc.), it does not constrain the provider system where the non-WEM-managed object resides. To WEM systems in accordance with representative embodiments of the instant disclosure, the provider system need only identify this non-WEM-managed object and distinguish between two classifications of objects (e.g., an item or a folder) through the pluggable provider framework.

As a specific example, a provider system (e.g., a content repository or information system) external to the WEM system may have and manage a product database. Each product in the associated product database may have a picture, a description, and metadata about the product, such as price, etc. When a user of WEM logs into WEM, they will not see in a WEM database a WEM-managed object that contains any information about the product (which is managed by the external provider system). Instead, the presentation of the product through WEM is accomplished dynamically.

Representative WEM systems may cache information once page fragments are generated; however, the WEM system does not store and/or manage an object that represents a particular product. Rather, the WEM system has a mandatory object that the provider system must have (i.e., a provider connection, referred to herein as an external content connection in some embodiments). The provider connection, which is generated based on the provider's implementation of a provider interface, provides sufficient information to retrieve the object representing a particular product. That is to say, when someone tries to get to the product by providing or selecting an identifier (ID) corresponding to the product, the provider connection can get the entire object representing the particular product and pull it back dynamically at runtime. In some embodiments, the WEM system may manage such product IDs through URLs and fields in a WEM database. This allows the WEM system to integrate external content/information managed by external provider systems, such as external repositories, without having to duplicate and/or manage the external content/information. The WEM system also does not have to manage auxiliary objects for every item (e.g., a product) that is external to the WEM system.

Figure 14:
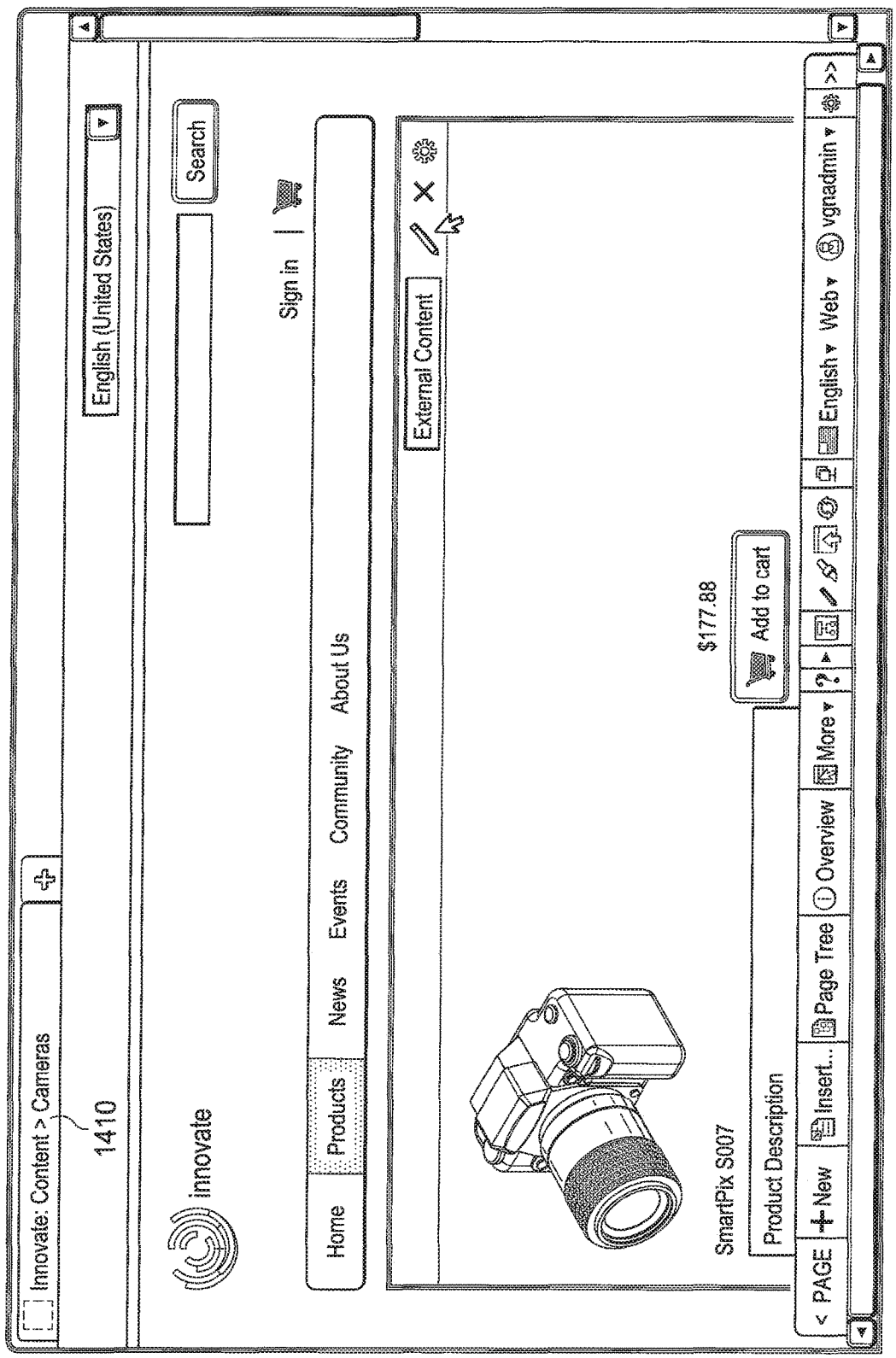
FIG. 14 depicts a diagrammatic representation of a WEM user interface showing an example of implementing the utilization of external content in accordance with a representative embodiment disclosed herein.

FIG. 14 depicts a diagrammatic representation of a WEM user interface 1400 showing one example of using external content according to some embodiments disclosed herein. The external content (an external item or component 1410) in the example of FIG. 14 is shown within a page template where a WEM user can write code (e.g., in HTML) for that particular content component based on information from, e.g., a JavaBean that is handed back from a provider system via a provider connection.

Figure 15:
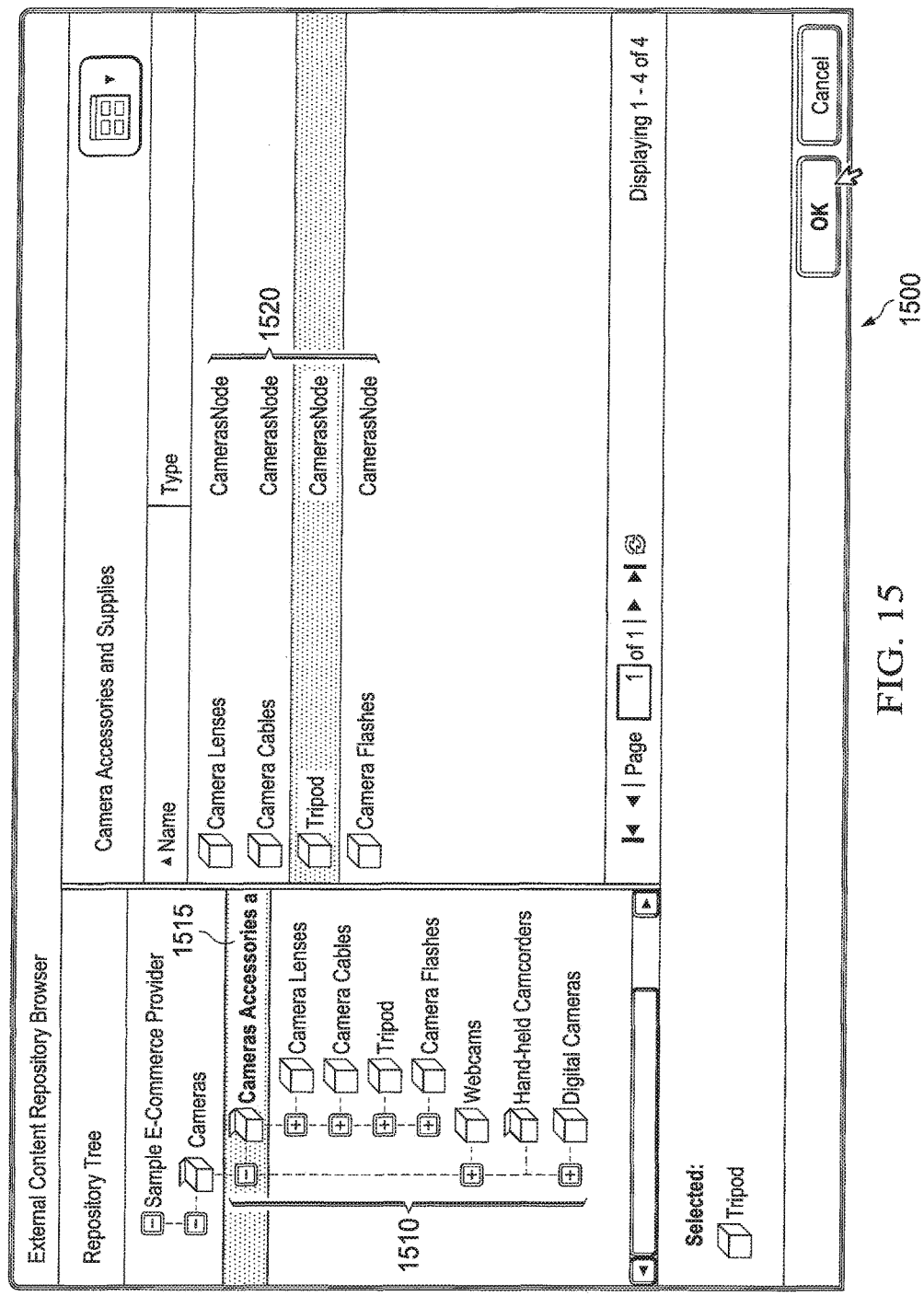
FIG. 15 depicts a diagrammatic representation of a WEM user interface showing one example of an external content repository browser according to some embodiments disclosed herein.

FIG. 15 depicts another diagrammatic representation of a WEM user interface 1500 showing a representative example of an external content repository browser according to representative embodiments disclosed herein. Provider hierarchy 1510 provides a data structure, e.g., for "Camera Accessories and Supplies" item 1515. Node display 1520 provides an area for the user to view and interact with elements of provider hierarchy 1510.

Figure 16:
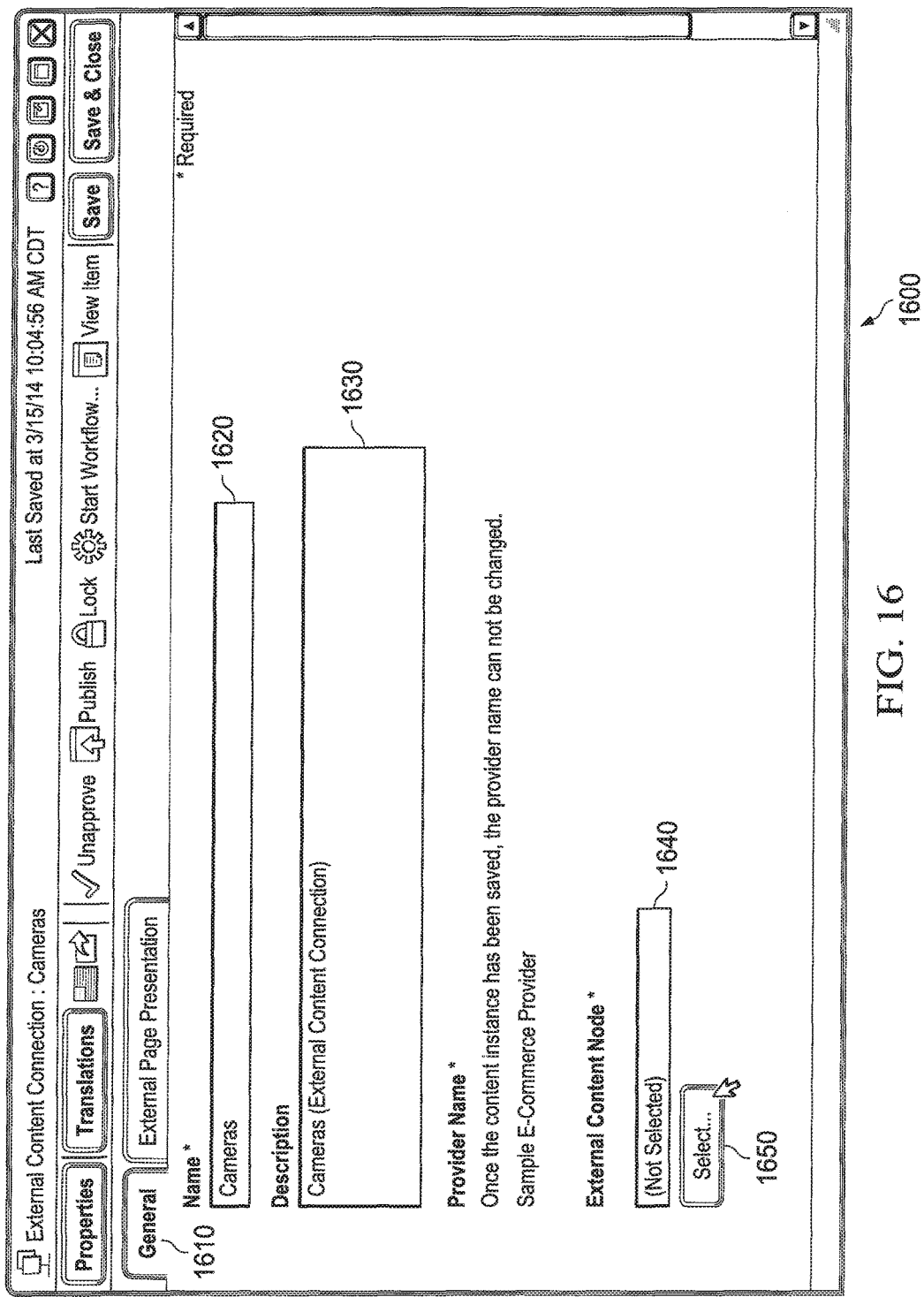
FIG. 16 depicts a diagrammatic representation of a WEM user interface showing an example of an external content connection to an external content repository in accordance with a representative embodiment disclosed herein.

FIG. 16 depicts a diagrammatic illustration of a WEM user interface 1600 for configuring an external content connection in accordance with representative embodiments disclosed herein. Under, e.g., a "General" information tab 1610, the user may define an external connection node Name 1620, a Description 1630 for the external connection node, and a connection 1640 to a registered External Content Node via, e.g., Selection button 1650. Engagement of Selection button 1650 may take the user to an interface substantially similar to, e.g., the WEM user interface generally depicted in FIG. 15.

Figure 17:
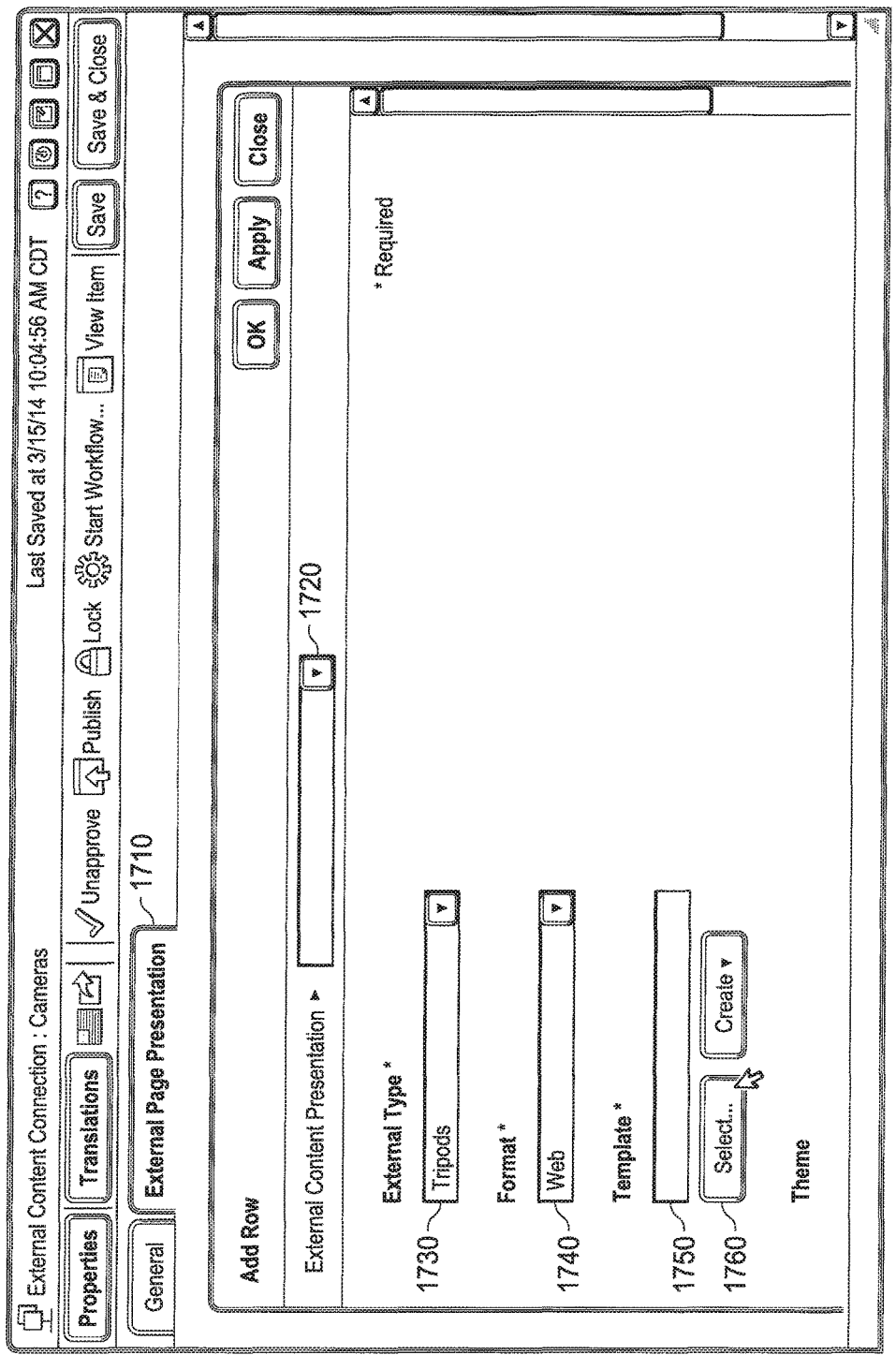
FIG. 17 depicts a diagrammatic representation of a WEM user interface showing one example of an external content connection to an external content repository in accordance with a representative embodiment disclosed herein.

Again, the WEM system need only know what external type an item of provider data corresponds to in order to select an appropriate template. This is generally illustrated, e.g., in FIG. 17 depicting a diagrammatic representation of a WEM user interface 1700 showing one example of template configuration for an external content connection of an external content repository according to representative embodiments disclosed herein. WEM user interface 1700 may comprise, e.g., External Page Presentation tab 1710, External Content Presentation dropdown list 1720, External Type dropdown list 1730, Format dropdown list 1740, Template field 1750, and Selection button 1760 for selecting a defined template.

The ability to access and retrieve non-WEM-managed objects dynamically via provider connections to provider systems allows for seamless integration of external content with internal presentation services provided by representatively disclosed WEM systems. WEM has a rich set of features for building web sites—what they look like, page templates, involved caching, regions, components, etc. To utilize a representatively disclosed presentation model, WEM provides a minimum number of touch points (which, in some embodiments may also be referred to as jump off points, mount paths, nodes, access locations, etc.) necessary for someone to build a web site using the disclosed rich features of WEM, but with data residing somewhere else. Each touch point has an appropriate provider connection associated therewith. For example, if a touch point is for a searchable provider (which may be defined at the interface given the provider class), its provider connection may be characterized with aspects of searching, such that a WEM user has the ability to perform searches of an external provider system via the provider connection and can navigate the external provider system as described by the interface (e.g., navigate by traversing a hierarchical structure where a node may contain a sub node or navigate to an item by random access with a given ID of the item). Unlike querying a database, it is not just a record that is returned. A provider connection also receives metadata about the content that comes back, and the metadata also may be integrated with the presentation in WEM.

The mechanism by which external content can be obtained using a provider connection is extensible and flexible. Each provider connection may be adapted to the implementation of each particular provider system. Different provider systems can implement very different provider connections. As an example, an external content provider may have an implementation where their content (external to WEM) is accessible via, e.g., RESTFUL type of API over HTTP (REpresentational State Transfer (REST) is a stateless architecture that generally runs over HTTP), while another external content provider may have a file-based implementation where access is performed using a file system and data descriptions are pulled via eXtensible Markup Language (XML) files. Yet another provider system may do this over File Transfer Protocol (FTP), etc. These communications technologies are known to those skilled in the art and thus are not further described herein.

Given that the WEM system can communicate (using whatever appropriate communications technology a user desires) with an external source which implements WEM interfaces, WEM can readily obtain, e.g., the name of an object and the type of the object. Thus, to WEM, it does not matter how a non-WEM-managed object is stored or managed by an external source, as long as the external source implements the interfaces by which a Java call can be made so that WEM can obtain its name, its subtype, determine if it is a node or an item, etc. and present it in a display view.

Such provider connections also allow WEM users to continue to use external information systems that they may already be using or with which they may be familiar. WEM does not interfere how users perform their duties. This means that when a new provider system is added to WEM via the pluggable provider framework, there may be nothing new to learn for those who had been and/or have knowledge of using that provider system. For example, some users may already know what their objects look like, how to use APIs to communicate with that provider system, what properties their objects may have, etc. They can continue to use those APIs and objects via the provider connection to the particular provider system. For example, the provider connection can provide a connection to an object residing at the provider system and hands back a native representation of the object to a user via a display view (e.g., a piece of HTML for displaying that object). The user can then use that third-party API (the provider system's API that the user is already familiar with) in order to access the object.

Conventional integration approaches do not allow such preservation of third-party APIs and/or passage of native representations from another system. Most integration approaches import all of the data, fully control the imported data and make it resemble internal data—this requires duplication, synchronization, storage, resources, etc. Alternatively, conventional approaches make small wrapper type objects over the external data using a delegation model, which allows access to an object through the use of proprietary, internally defined APIs. This requires a user to learn and use new data models and new APIs.

The dynamic and seamless integration approach disclosed herein does not require a user of representatively disclosed WEM systems to learn and use new data models and new APIs in order to use non-WEM-managed content in constructing and/or editing web experiences. Consider, for example, the aforementioned product database managed by an external content repository. To manage products in the product database, a schema may be defined for storing Stock Keeping Units (SKUs), images, product descriptions, etc. Depending on, e.g., product types, the schema may specify different types of information. Users (e.g., software developers) who use the product database will be familiar with the API. The external content repository may be configured to build an adapter (e.g., via an SDK from the WEM system) that passes a native representation (e.g., a JavaBean, a JSON string, etc.) to the WEM system in order for their software developers to continue to write JavaServer Pages (JSP) code (or other technology capable of allowing software developers to create dynamically generated web pages based on HTML, XML, or other document types) using their prior knowledge and/or existing domain expertise to build their site using the WEM system. There is generally no need to build wrapper objects or learn a new schema, etc. With the pluggable provider framework disclosed herein, even though the schema defined by the external content repository may be completely opaque to the WEM system, WEM can render non-WEM-managed content via WEM's presentation services just as if WEM were charged with the management of that content.

The WEM system's presentation services may comprise an object model having page templates. A page template may be an instance of a WEM ContentType. The rendering of a page template may be configured to produce, e.g., an HTML document. For example, a template may have certain regions and each region may have certain components. Each template has data that describes the layout, links (e.g., URLs), and other aspects of the page. Within, e.g., a lower level of components, there may be an image or a body of a story. One piece of that component may be configured with a display view, which may correspond to a type of object in the system that can read an object and, from that object, produce/generate HTML code (an HTML code fragment), and then populate it on a page. With representative embodiments of dynamic integration approaches disclosed herein, a provider connection can provide a WEM user with a connection to non-WEM-managed content of a provider system (external to WEM), hand them back, and display them within the display view of an object that is in a native representation (e.g., a JavaBean) so that they can write their own code (e.g., using native APIs) to control how they want their web site to look and feel. This allows WEM users to construct web site(s) using WEM, down to the granular level that they can interact with external sources (e.g., third-party content providers) just as before, but now dynamically and seamlessly integrated with local content managed by WEM.

Specifically, within a display view, a WEM user can interact with non-WEM-managed objects at an external source using APIs that are native to the external source. Through the provider implementation in the pluggable provider framework, a WEM user can choose what that object looks like on a web site using, e.g., an API that is native to the external source, a custom API that the user wrote, or some other API—such as one for, e.g., an elastic cloud.

The preceding is part of the pluggable provider framework and the behaviors of each implementation depend on what properties and what controls each implementation supports when a provider connection is implemented. The WEM system performs the management of identifying and accessing non-WEM-managed content, giving WEM users the ability to write code to interact with non-WEM-managed content, generating a fragment containing the code, and optionally caching it. Various representatively disclosed methods provide a dynamic and seamless way of abstracting types of objects WEM is dealing with at the presentation layer, regardless of whether they are external content of any type or internal content. Furthermore, because third-party APIs can be preserved, WEM users are provided the opportunity to use whatever APIs they are familiar with and/or that suit their needs.

An additional benefit of using presentation services along with external content is that any external content brought into WEM can be enriched. That is to say, in addition to distributing external items throughout a web site that a WEM user is developing or editing, the WEM user can add additional information for any particular external item. For example, in addition to the price, description, and images of a product (which, as described in the preceding examples, is managed by a provider system), a WEM user can add reviews, rankings, comments, and/or the like. WEM manages the additional information generated this way, which may be in free form and can be in any content type the user chooses (e.g., the WEM user may call it "My Type"). For each type of external item, a WEM user can define a content type in WEM that they want to use to enrich that type of external item. Accordingly, in representative embodiments, a method for dynamic provider data integration with managed content may further comprise providing a user interface for enriching the provider data.

A searchable provider (with reference to a searchable provider interface that WEM can implement) may be configured to define a set of methods including how to search a search provider's repository. WEM may be configured to provide a plurality of interfaces to support this function. For example, if a WEM user chooses to use a searchable provider, then the user can utilize that provider, or a WEM user may implement a content provider (or other resource) for their web site. When a WEM user searches an item in a representative system disclosed herein, they may get external content.

A method of exposing and connecting to native content on a web site where the native content remains external to a WEM system may comprise, in the WEM system, exposing the native content in an external repository external to the WEM system. The external content may be characterized by a native representation and may include native objects. As described in various representative embodiments herein, native content may be exposed by generating an external connector (e.g., a provider connection) to the external content for exposing and accessing native objects. In representative embodiments, generating an external connector to the external content may include generating an external content interface to define behaviors for the external content. Such behaviors may include ways to display the external content. Generating the external content interface may include generating a search interface to enable searching of external content, and searching the external content may control interaction with, e.g., external data in the WEM system and/or display of the external content in a web site.

In various representative embodiments, a method may further comprise connecting to external content by connecting to native objects to enable interaction with the native objects in their native representation. In representative embodiments, a method may further comprise providing external content to the web site without the need to copy and/or synchronize the external content within the WEM system.

In various representative embodiments, the external repository may include a plurality of repositories. The external content of at least one of the repositories and the external content of at least one other of the repositories may be characterized by different native representations and/or different native formats. Nevertheless, the external content may be integrated with local content accessed via the WEM system as described above.

Routines, methods, steps, operations or portions thereof described herein may be implemented through control logic, including computer executable instructions stored on a computer-readable medium, hardware, firmware or a combination thereof. The control logic can be adapted to direct an information-processing device to perform a set of steps disclosed in the various embodiments. Some embodiments may be implemented by using software programming or code in one or more digital computers, by using application specific integrated circuits (ASICs), programmable logic devices, field programmable gate arrays (FPGAs), optical, chemical, biological, quantum or nano-engineered systems, components and mechanisms. Based on the disclosure and teachings provided herein, a person skilled in the art will appreciate other ways or methods to implement the invention.

Computer executable instructions or code can be stored in a computer-readable medium and can be operated on by a processor to permit a computer to perform functions, steps, operations, methods, routines, operations or portions thereof described herein. Any suitable programming language may be used, including: C, C++, Java, JavaScript, assembly language, or other programming or scripting code. Different programming techniques can be employed, such as procedural or object oriented programming. In an embodiment, HTML may utilize client-side or server-side scripting to provide a means of automation and calculation through coding.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of data storage medium that can store computer instructions, including, but not limited to ROM, RAM, HDs, data cartridges, data backup magnetic tapes, floppy diskettes, flash memory, optical data storage, CD-ROMs, or the like. The computer-readable medium can be, by way of example, but not by limitation, an electronic, magnetic, optical, electromagnetic, infrared, or semiconductor system, apparatus, system, device, or computer memory. The computer-readable medium may include multiple computer-readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations; for example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments may be implemented in a computer communicatively coupled to a network (for example, the Internet, an intranet, an internet, a WAN, a LAN, a storage area network ("SAN"), a personal area network ("PAN"), etc.), another computer, or in a standalone computer. As is known to those skilled in the art, the computer can include a CPU or processor, memory (e.g., primary or secondary memory such as RAM, ROM, HD or other computer-readable medium for the persistent or temporary storage of instructions and data) and one or more I/O device(s). The I/O devices can include a keyboard, monitor, printer, electronic pointing device (for example, mouse, trackball, stylus, etc.), touch screen, or the like. In representative embodiments, the computer has access to at least one database on the same hardware or over the network.

Steps, operations, methods, routines or portions thereof of the invention may be implemented on one computer or shared among two or more computers. In one embodiment, the functions of the invention may be distributed in the network. Communications between computers implementing representative embodiments can be accomplished using any electronic, optical, radio frequency signals, or other suitable methods and tools of communication in compliance with network or other communications protocols.

As used herein, the terms "comprises," "comprising," "includes," "including," "has," "having" or any contextual variant thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification, and all such embodiments are intended to be included within the scope of that term or terms. Language designating such non-limiting examples and illustrations includes, but is not limited to: "for example," "for instance," "e.g.," "in a representative embodiment," "in one embodiment."

Reference throughout this specification to "one embodiment," "an embodiment," "a representative embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature, or function is not intended to limit the scope of the invention to such embodiment, feature, or function). Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures, and it will be appreciated that in some instances, some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components or methods, to provide a thorough understanding of representative embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment, and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component. The scope of the present disclosure should be determined by the following claims and their legal equivalents.

What is claimed is:

1. A system, comprising:
   a processor;
   a non-transitory computer-readable medium; and
   stored instructions translatable by the processor to perform:
   configuring an implementation of a provider interface into a provider framework of the system, the provider interface specific to a provider system, wherein the provider interface defines provider implementation behaviors specified by the provider system for interfacing with a content repository of the provider system, the provider system communicatively connected to the system over a network and wherein the configuring further comprises specifying a method for implementing the provider implementation behaviors for interfacing with the content repository of the provider system, the provider framework of the system comprising provider interfaces configured for connecting the system to different provider systems;
   discovering the provider implementation behaviors upon instantiation of a provider implementation class contained in the implementation of the provider interface specific to the provider system;
   engaging a provider connection to the content repository of the provider system using the provider interface specific to the provider system to connect to the content repository of the provider system;
   accessing the content repository of the provider system through the provider connection;
   obtaining a native representation of an object stored in the content repository of the provider system using the method implementing the provider implementation behaviors; and displaying the native representation obtained from the provider system on a client device of the system.

2. The system of claim 1, wherein the stored instructions are further translatable by the processor to perform:
providing a display view on the client device; and
displaying the native representation obtained from the provider system within the display view on the client device.

3. The system of claim 1, wherein the stored instructions are further translatable by the processor to perform:
generating a page fragment representing the object stored in the content repository of the provider system, the generating utilizing the native representation of the object.

4. The system of claim 3, wherein the stored instructions are further translatable by the processor to perform:
storing the page fragment at a data storage local to the system, the data storage managed by the system.

5. The system of claim 1, wherein the native representation obtained from the provider system comprises a string or a JavaBean, the string containing attribute-value pairs, the JavaBean encapsulating a plurality of objects into a single object.

6. The system of claim 5, wherein the stored instructions are further translatable by the processor to perform:
presenting the string on the client device through a presentation service provided by the system without manipulation of the string.

7. The system of claim 5, wherein the stored instructions are further translatable by the processor to perform:
presenting the plurality of objects on the client device through a presentation service provided by the system without manipulation of the JavaBean.

8. A method, comprising:
configuring, by a system having a processor and a non-transitory computer-readable medium, an implementation of a provider interface into a provider framework of the system, the provider interface specific to a provider system, wherein the provider interface defines provider implementation behaviors specified by the provider system for interfacing with a content repository of the provider system, the provider system communicatively connected to the system over a network and wherein the configuring further comprises specifying a method for implementing the provider implementation behaviors for interfacing with the content repository of the provider system, the provider framework of the system comprising provider interfaces configured for connecting the system to different provider systems;
discovering, by the system, the provider implementation behaviors upon instantiation of a provider implementation class contained in the implementation of the provider interface specific to the provider system;
engaging, by the system, a provider connection to the content repository of the provider system using the provider interface specific to the provider system to connect to the content repository of the provider system;
accessing, by the system, the content repository of the provider system through the provider connection;
obtaining, by the system, a native representation of an object stored in the content repository of the provider system using the method implementing the provider implementation behaviors; and
displaying, by the system, the native representation obtained from the provider system on a client device of the system.

9. The method according to claim 8, further comprising:
providing a display view on the client device; and
displaying the native representation obtained from the provider system within the display view on the client device.

10. The method according to claim 8, further comprising:
generating a page fragment representing the object stored in the content repository of the provider system, the generating utilizing the native representation of the object.

11. The method according to claim 10, further comprising:
storing the page fragment at a data storage local to the system, the data storage managed by the system.

12. The method according to claim 8, wherein the native representation obtained from the provider system comprises a string or a JavaBean, the string containing attribute-value pairs, the JavaBean encapsulating a plurality of objects into a single object.

13. The method according to claim 12, further comprising:
presenting the string on the client device through a presentation service provided by the system without manipulation of the string.

14. The method according to claim 12, further comprising:
presenting the plurality of objects on the client device through a presentation service provided by the system without manipulation of the JavaBean.

15. A computer program product comprising a non-transitory computer-readable medium storing instructions translatable by a processor of a system for:
configuring an implementation of a provider interface into a provider framework of the system, the provider interface specific to a provider system, wherein the provider interface defines provider implementation behaviors specified by the provider system for interfacing with a content repository of the provider system, the provider system communicatively connected to the system over a network and wherein the configuring further comprises specifying a method for implementing the provider implementation behaviors for interfacing with the content repository of the provider system, the provider framework of the system comprising provider interfaces configured for connecting the system to different provider systems;
discovering the provider implementation behaviors upon instantiation of a provider implementation class contained in the implementation of the provider interface specific to the provider system;
engaging a provider connection to the content repository of the provider system using the provider interface specific to the provider system to connect to the content repository of the provider system;
accessing the content repository of the provider system through the provider connection;
obtaining a native representation of an object stored in the content repository of the provider system using the method implementing the provider implementation behaviors; and
displaying the native representation obtained from the provider system on a client device of the system.

16. The computer program product of claim 15, wherein the instructions are further translatable by the processor to perform:
   providing a display view on the client device; and
   displaying the native representation obtained from the provider system within the display view on the client device.

17. The computer program product of claim 15, wherein the instructions are further translatable by the processor to perform:
   generating a page fragment representing the object stored in the content repository of the provider system, the generating utilizing the native representation of the object.

18. The computer program product of claim 17, wherein the instructions are further translatable by the processor to perform:
   storing the page fragment at a data storage local to the system, the data storage managed by the system.

19. The computer program product of claim 15, wherein the native representation obtained from the provider system comprises a string or a JavaBean, the string containing attribute-value pairs, the JavaBean encapsulating a plurality of objects into a single object.

20. The computer program product of claim 19, wherein the instructions are further translatable by the processor to perform:
   presenting the string or the plurality of objects on the client device through a presentation service provided by the system.

* * * * *